(12) United States Patent
Will

(10) Patent No.: US 9,147,138 B2
(45) Date of Patent: Sep. 29, 2015

(54) METHOD, APPARATUS AND SYSTEM FOR RENDERING AN IMAGE BASED ON COST OF TRACKING BAND EDGES

(71) Applicant: CANON KABUSHIKI KAISHA, Tokyo (JP)

(72) Inventor: Alexander Will, Randwick (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/572,600

(22) Filed: Dec. 16, 2014

(65) Prior Publication Data

US 2015/0178601 A1    Jun. 25, 2015

(51) Int. Cl.
*G06F 3/12* (2006.01)
*G06K 15/02* (2006.01)

(52) U.S. Cl.
CPC ............. *G06K 15/186* (2013.01); *G06F 3/122* (2013.01); *G06F 3/1239* (2013.01); *G06F 3/1276* (2013.01); *G06K 15/1807* (2013.01); *G06K 15/1823* (2013.01); *G06K 15/1851* (2013.01); *G06K 15/1857* (2013.01); *G06K 15/1861* (2013.01)

(58) Field of Classification Search
None
See application file for complete search history.

(56) References Cited

U.S. PATENT DOCUMENTS

| | | | |
|---|---|---|---|
| 5,307,449 A | 4/1994 | Kelley et al. | |
| 6,067,097 A | 5/2000 | Morita et al. | |
| 6,326,964 B1 | 12/2001 | Snyder et al. | |
| 6,518,971 B1 | 2/2003 | Pesto et al. | |
| 7,436,531 B2 | 10/2008 | Plass et al. | |
| 7,719,538 B1 | 5/2010 | Chen et al. | |
| 8,228,555 B2 | 7/2012 | Prebble | |
| 8,531,725 B2 | 9/2013 | Morrison et al. | |
| 2003/0231330 A1 | 12/2003 | Westervelt et al. | |
| 2007/0279705 A1 | 12/2007 | Takiyama et al. | |
| 2009/0303245 A1 | 12/2009 | Soupikov et al. | |
| 2011/0216068 A1 | 9/2011 | Sathe | |
| 2011/0235911 A1 | 9/2011 | Kuroki et al. | |
| 2013/0155456 A1 | 6/2013 | Morrison et al. | |

FOREIGN PATENT DOCUMENTS

| | | |
|---|---|---|
| EP | 0600204 A2 | 6/1994 |
| WO | 2005020157 A1 | 3/2005 |

OTHER PUBLICATIONS

Whitman, Scott; Dynamic Load Balancing for Parallel Polygon Rendering; IEEE Computer Graphics and Applications; Jul. 1994, pp. 41-48.

*Primary Examiner* — Scott A Rogers
(74) *Attorney, Agent, or Firm* — Canon U.S.A., Inc. IP Division

(57) ABSTRACT

A method of rendering an image as a plurality of bands is disclosed. A plurality of edge tracking conditions for at least one of the bands is determined, the edge tracking conditions comprising waiting for at least one other band. A plurality of distinct rendering schedules is determined for the image, each rendering schedule specifying an edge tracking condition for each of the bands, the edge tracking condition for each band being selected from the corresponding plurality of edge tracking conditions for the band. A cost for a rendering schedule is determined. The rendering schedule cost is based on an edge tracking condition specified for each of the bands using a tracking cost of edges associated with the band through at least one intermediate band positioned between the band and the band specified in the edge tracking condition. The image is rendered in accordance with a selected rendering schedule, the rendering schedule being selected based on the cost determined for the rendering schedule.

16 Claims, 14 Drawing Sheets

METHOD, APPARATUS AND SYSTEM FOR RENDERING AN IMAGE BASED ON COST OF TRACKING BAND EDGES

REFERENCE TO RELATED PATENT APPLICATION(S)

This application claims the benefit under 35 U.S.C. §119 of the filing date of Australian Patent Application No. 2013273716, filed 19 Dec. 2013, hereby incorporated by reference in its entirety as if fully set forth herein.

TECHNICAL FIELD

The present invention relates to the field of computer graphics and, in particular, to a method, apparatus and system for rendering an image. The present invention also relates to a computer program product including a computer readable medium having recorded thereon a computer program for rendering an image.

BACKGROUND

In commercial printing, printing speeds are in the thousands of pages-per-minute (ppm), typically measured in meters/second or monthly throughput. Such printing speeds are achieved using commodity hardware, and configuring software to have a suitable high level of parallelism.

Speeds of printing machines are increasing, as commodity hardware becomes cheaper and more powerful, customer demands increase, and processing becomes increasingly centralised on a global scale. Cloud-based services are an example of such trends. However, with improved hardware, deficiencies in scalability of existing software is exposed, and a need to adapt software and create new algorithms arises.

In the printing of a page, objects arrive in z-order, and are typically organised into y-dimension bands, where each band consists of one or more consecutive scan lines. Parallelism is therefore possible both in the z-dimension by processing objects as the objects arrive, and in the y-dimension by processing bands in parallel. Typically, y-dimension parallelism must wait for all objects to be received before proceeding. The obstacle to achieving y-dimension parallelism is due to dependencies between bands, caused by objects that span multiple bands on a page. If a band contains an object that starts at a scan line prior to a first scan line of the band, the object will typically need to be tracked until the state of the object at the start of the band is known, so that the band can be processed or rendered. Therefore, the band is dependent on the tracking information produced by the previous band. Tracking is a time-consuming process, typically involving the vectorising and possible scan conversion of edges if the object up to the scan line or band the object is being tracked to.

Some conventional rendering methods include expensive pre-processing of each object spanning multiple bands to form a collection of non-overlapping objects that each fit within a single predefined band. Other conventional rendering methods include merging of adjacent bands so that the merged band wholly contains objects, thereby avoiding the need to partition objects. Merging bands, however, reduces available parallelism.

Other conventional rendering methods simply re-track each object from an origin to the start of each band, for each band that the object intersects. Simply re-tracking each object can be prohibitively expensive for complex objects that intersect multiple bands, as portions of the objects need to be processed multiple times.

Thus a need exists for an improved rendering method.

SUMMARY

It is an object of the present invention to substantially overcome, or at least ameliorate, one or more disadvantages of existing arrangements.

Disclosed are arrangements which seek to address the above problems by parallel processing shapes across multiple bands in a page.

According to one aspect of the present disclosure, there is provided a method of rendering an image as a plurality of bands, the method comprising:

determining a plurality of edge tracking conditions for at least one of said bands, the edge tracking conditions comprising waiting for at least one other band;

determining a plurality of distinct rendering schedules for the image, each rendering schedule specifying an edge tracking condition for each of said bands, the edge tracking condition for each band being selected from the corresponding plurality of edge tracking conditions for said band;

determining a cost for a rendering schedule, the rendering schedule cost being based on an edge tracking condition specified for each of the bands using a tracking cost of edges associated with the band through at least one intermediate band positioned between said band and the band specified in the edge tracking condition; and rendering the image in accordance with a selected rendering schedule, the rendering schedule being selected based on the cost determined for the rendering schedule.

According to another aspect of the present disclosure, there is provided method of rendering an image as a plurality of bands, the method comprising:

determining a first cost value associated with independent edge tracking of at least one of said bands;

determining a second cost value associated with edge tracking of said band using data from a further band, the second cost value comprising a cost of tracking edges of the further band and a cost of tracking edges associated with said band through at least one intermediate band positioned between said band and the further band; and rendering the image using the first and second cost values, wherein rendering of said band is postponed until edge tracking data is received from the further band, the postponing being performed in response to a determination using the cost values that resource utilisation associated with the rendering would be reduced due to the postponing.

According to still another aspect of the present disclosure, there is provided an apparatus for rendering an image as a plurality of bands, the method comprising:

means for determining a plurality of edge tracking conditions for at least one of said bands, the each edge tracking conditions comprising waiting for at least one other band;

means for determining a plurality of distinct rendering schedules for the image, each rendering schedule specifying an edge tracking condition for each of said bands, the edge tracking condition for each band being selected from the corresponding plurality of edge tracking conditions for said band;

means for determining a cost for a rendering schedule, the rendering schedule cost being based on an edge tracking condition specified for each of the bands using a tracking cost of edges associated with the band through at least one intermediate band positioned between said band and the band specified in the edge tracking condition; and means for rendering the image in accordance with a selected rendering schedule, the rendering schedule being selected based on the cost determined for the rendering schedule.

According to still another aspect of the present disclosure, there is provided a system for rendering an image as a plurality of bands, the system comprising:
  a memory for storing data and a computer program;
  a processor coupled to the memory for executing the computer program, the computer program comprising instructions for:
    determining a plurality of edge tracking conditions for at least one of said bands, the edge tracking conditions comprising waiting for at least one other band;
    determining a plurality of distinct rendering schedules for the image, each rendering schedule specifying an edge tracking condition for each of said bands, the edge tracking condition for each band being selected from the corresponding plurality of edge tracking conditions for said band;
    determining a cost for a rendering schedule, the rendering schedule cost being based on an edge tracking condition specified for each of the bands using a tracking cost of edges associated with the band through at least one intermediate band positioned between said band and the band specified in the edge tracking condition; and
    rendering the image in accordance with a selected rendering schedule, the rendering schedule being selected based on the cost determined for the rendering schedule.

According to still another aspect of the present disclosure, there is provided a computer readable medium comprising a program stored thereon for rendering an image as a plurality of bands, the program comprising:
  code for determining a plurality of edge tracking conditions for at least one of said bands, the edge tracking conditions comprising waiting for at least one other band;
  code for determining a plurality of distinct rendering schedules for the image, each rendering schedule specifying an edge tracking condition for each of said bands, the edge tracking condition for each band being selected from the corresponding plurality of edge tracking conditions for said band;
  code for determining a cost for a rendering schedule, the rendering schedule cost being based on an edge tracking condition specified for each of the bands using a tracking cost of edges associated with the band through at least one intermediate band positioned between said band and the band specified in the edge tracking condition; and
  code for rendering the image in accordance with a selected rendering schedule, the rendering schedule being selected based on the cost determined for the rendering schedule.

According to still another aspect of the present disclosure, there is provided an apparatus for rendering an image as a plurality of bands, the apparatus comprising:
  means for determining a first cost value associated with independent edge tracking of at least one of said bands;
  means for determining a second cost value associated with edge tracking of said band using data from a further band, the second cost value comprising a cost of tracking edges of the further band and a cost of tracking edges associated with said band through at least one intermediate band positioned between said band and the further band; and
  means for rendering the image using the first and second cost values, wherein rendering of said band is postponed until edge tracking data is received from the further band, the postponing being performed in response to a determination using the cost values that resource utilisation associated with the rendering would be reduced due to the postponing.

According to still another aspect of the present disclosure, there is provided a system for rendering an image as a plurality of bands, the system comprising:
  a memory for storing data and a computer program;
  a processor coupled to the memory for executing the computer program, said computer program comprising instructions for:
    determining a first cost value associated with independent edge tracking of at least one of said bands;
    determining a second cost value associated with edge tracking of said band using data from a further band, the second cost value comprising a cost of tracking the edges of the further band and a cost of tracking edges associated with said band through at least one intermediate band positioned between said band and the further band; and
    rendering the image using the first and second cost values, wherein rendering of said band is postponed until edge tracking data is received from the further band, the postponing being performed in response to a determination using the cost values that resource utilisation associated with the rendering would be reduced due to the postponing.

According to still another aspect of the present disclosure, there is provided a computer readable medium having a program stored thereon for rendering an image as a plurality of bands, the program comprising:
  code for determining a first cost value associated with independent edge tracking of at least one of said bands;
  code for determining a second cost value associated with edge tracking of said band using data from a further band, the second cost value comprising a cost of tracking edges of the further band and a cost of tracking edges associated with said band through at least one intermediate band positioned between said band and the further band; and
  code for rendering the image using the first and second cost values, wherein rendering of said band is postponed until edge tracking data is received from the further band, the postponing being performed in response to a determination using the cost values that resource utilisation associated with the rendering would be reduced due to the postponing.

Other aspects of the invention are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1:
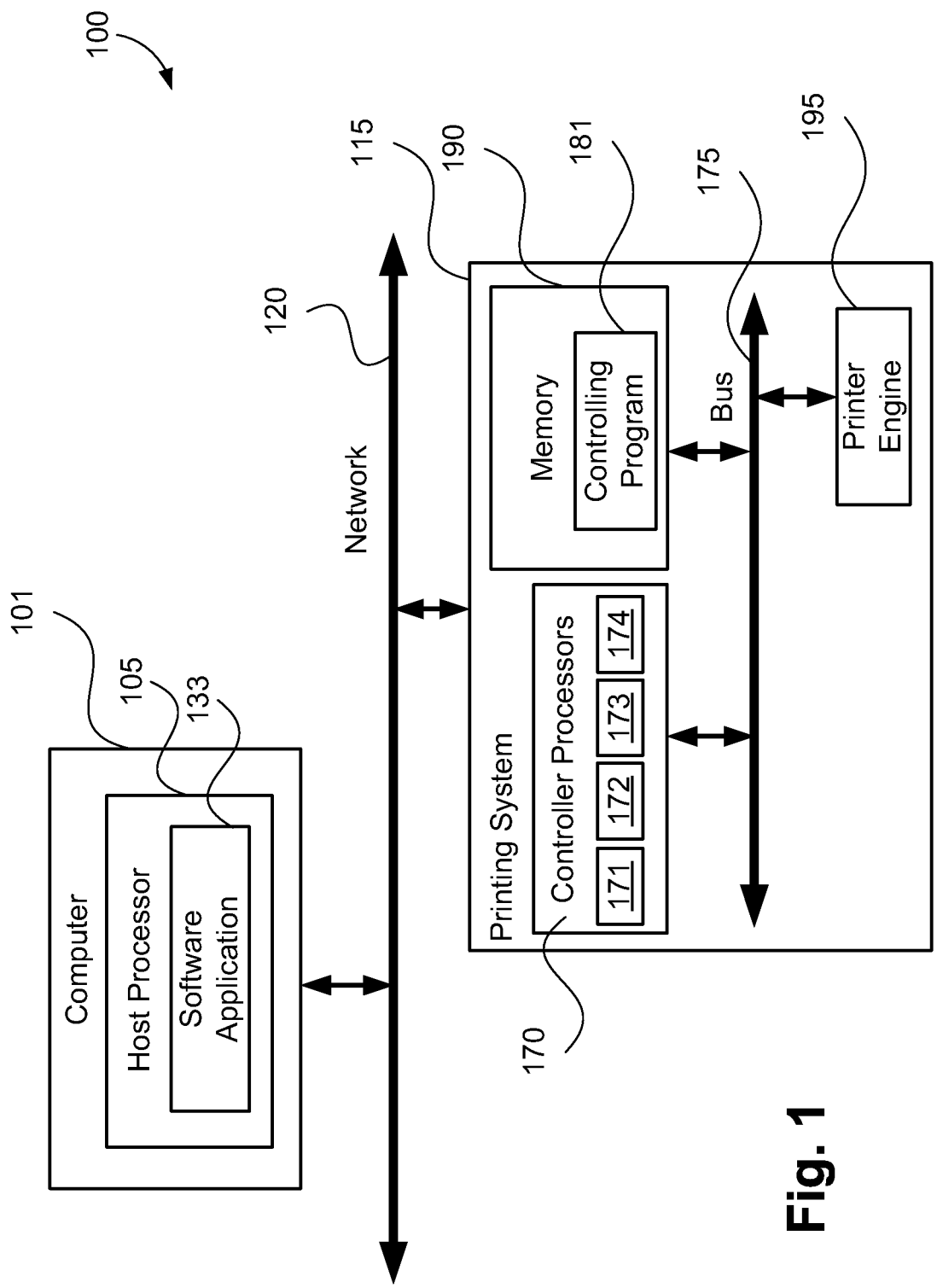
FIG. 1 is a schematic block diagram of a multi-processor printing system for rendering a page.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of a pixel rendering system 100 for rendering graphic objects. The pixel rendering system 100 comprises a computer module 101 connected to a printing system 115 through a communications network 120. The network 120 may be a wide-area network (WAN), such as the Internet, a cellular telecommunications network, or a private WAN. The network 120 may comprise multiple computers. Alternatively, the network 120 may be a single computer module 101 and a printing system (e.g., 115). Alternatively, the computer 101 and printing system 115 may be connected by a cable used to communicate between devices, such as a USB, serial, parallel or FireWire cable.

The computer module 101 comprises at least one host processor 105 for executing a software application 133, such as a word processor or graphical software application.

The printing system 115 comprises plurality of controller processors 170. As shown in FIG. 1, the processors 170 comprise four processors 171, 172, 173 and 174, for executing one or more software code modules forming a controlling program 181 which is stored in a memory 190. Alternatively, the controller processors 170 may comprise processors that take the form of single-core CPUs, GPUs, or any other form of computer processor such as field-programmable gate arrays (FPGAs). In another alternative, the controller processors 170 may comprise a mixture of the various kinds of processors described above.

The printing system 115 also has a printer engine 195 coupled to the controller processors 170, via an interconnected bus 175. The controlling program 181 accepts a printable page 201 (see FIG. 2) produced by a software application 133 and produces pixel data values for printing. As described below, the controlling program 181 is configured for receiving a plurality of objects of the document 201 with associated fill data and a drawing operation for use in producing the pixel data values for printing. The pixel data values may then be stored in memory 190 and reproduced as pixels by the printer engine 195, for example. The controlling program 181 may be executed by the controller processors 170 in one or more threads of execution. A program thread consists of a number of instructions or steps that are executed in sequence by one of the processors 171-174. The controlling program 181 will be further described in detail below with reference to FIG. 2.

Figure 3A:
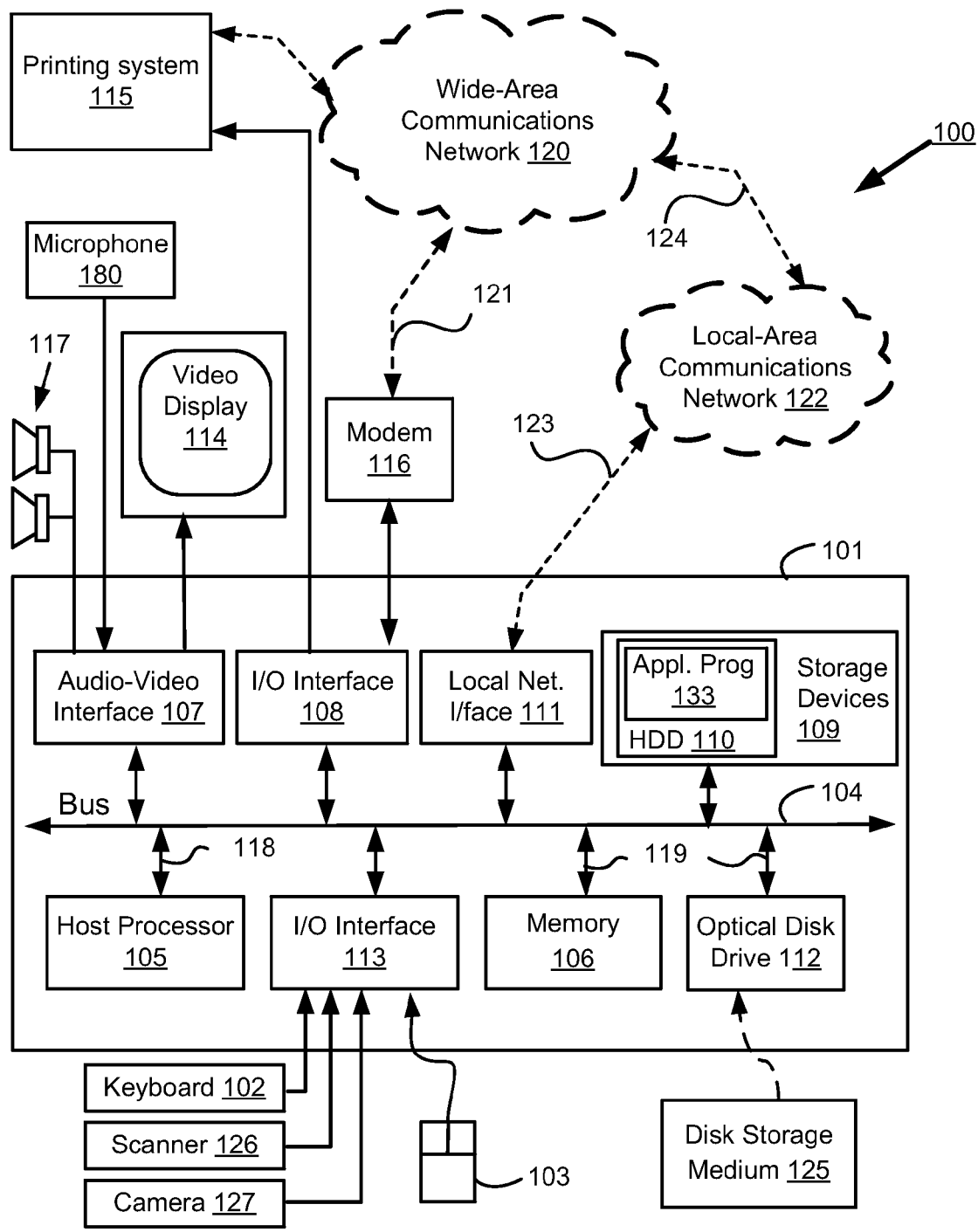
FIGS. 3A and 3B collectively form a schematic block diagram of a general purpose computer system of the system of FIG. 1 in more detail.

As seen in more detail in FIG. 3A, the pixel rendering system 100 includes: the computer module 101; input devices such as a keyboard 102, a mouse pointer device 103, a scanner 126, a camera 127 and a microphone 180; and output devices including the printing system 115, a display device 114 and loudspeakers 117. An external Modulator-Demodulator (Modem) transceiver device 116 may be used by the computer module 101 for communicating to and from the communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes the at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and the printing system 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 3A, the local communications network 122 may also couple to the wide network 120 via a connection 124, which would typically include a so-called "firewall" device or device of similar functionality. The local network interface 111 may comprise an Ethernet circuit card, a Bluetooth™ wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac or alike computer systems.

The described methods may be implemented using the system 100 wherein one or more steps of the processes of FIGS. 2 and 4 to 11, to be described, may be implemented as one or more code modules of the software application program 133 executable within the system 100. One or more of the steps of the described methods may be effected by instructions 131 (see FIG. 3B) in the software 133 that are carried out within the system 100.

As also described below, one or more steps of the processes of FIGS. 2 and 4 to 11 to be described, may be implemented as one or more of the code modules forming the controlling program 181 executable within the printing system 115. Again, one or more of the steps of the described methods may be effected by instructions of the controlling program 181, similar to the instructions 131 in the software 133.

The software instructions 131 implementing the software 133 may be formed as the one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the system 100 from the computer readable medium, and then executed by the system 100. A computer readable medium having such software or computer program recorded on the computer readable medium is a computer program product. The use of the computer program product in the system 100 preferably effects an advantageous apparatus for implementing the described methods.

In some instances, the application programs 133 may be supplied to the user encoded on one or more CD-ROMs 125 and read via the corresponding drive 112, or alternatively may be read by the user from the networks 120 or 122. Still further, the software can also be loaded into the system 100 from other computer readable media. Computer readable storage media refers to any non-transitory tangible storage medium that provides recorded instructions and/or data to the system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application program 133 and the corresponding code modules mentioned above may be executed to implement one or more graphical user interfaces (GUIs) to be rendered or otherwise represented upon the display 114. Through manipulation of typically the keyboard 102 and the mouse 103, a user of the system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 3B:
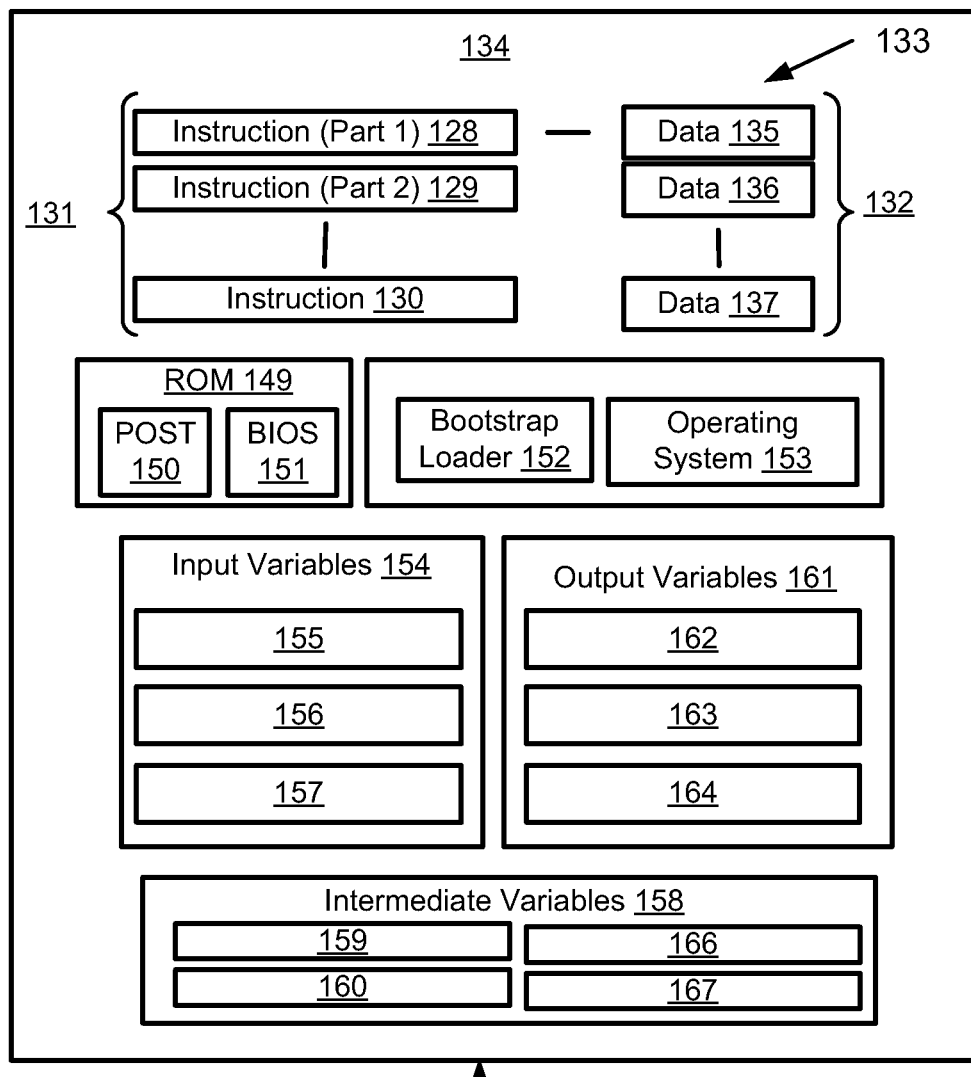
Figure 3B:
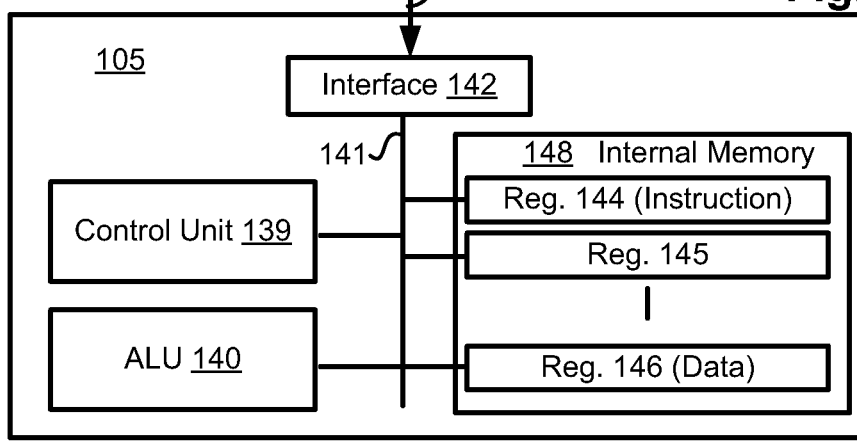

FIG. 3B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 3A.

When the computer module 101 is initially powered up, a power-on self-test (POST) program 150 executes. The POST program 150 is typically stored in a ROM 149 of the semiconductor memory 106 of FIG. 3A. A hardware device such as the ROM 149 storing software thereon is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 3A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIGS. 1 and 3A need to be used properly, so that each process can run effectively. Accordingly, the aggregated memory 134 is not intended to illustrate how particular segments of memory are allocated (unless otherwise stated), but rather to provide a general view of the memory accessible by the system 100 and how such is used.

As shown in FIG. 3B, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 3A. The execution of a set of the instructions may in some cases result in output of data. Execution may also involve storing data or variables to the memory 134.

The methods described below may use input variables 154, which are stored in the memory 134 in corresponding memory locations 155, 156, 157. The disclosed methods produce output variables 161, which are stored in the memory 134 in corresponding memory locations 162, 163, 164. Intermediate variables 158 may be stored in memory locations 159, 160, 166 and 167.

Referring to the processor 105 of FIG. 3B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

(a) a fetch operation, which fetches or reads an instruction 131 from a memory location 128, 129, 130;

(b) a decode operation in which the control unit 139 determines which instruction has been fetched; and (c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

One or more steps or sub-processes in the processes of FIGS. 2 and 4 to 11 may be associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

As described above, one or more steps of the processes of FIGS. 2 and 4 to 11, to be described, may be implemented as one or more code modules of the controlling program 181 executable within the printing system 115. The code modules forming the controlling program 181 are typically stored in the memory 190. The code modules forming the controlling program 181 may be loaded into the printing system 115 from the computer readable medium, and then executed by the printing system 115. A computer readable medium having such software or computer program recorded on the computer readable medium is a computer program product. The use of the computer program product in the printing system 115 preferably effects an advantageous apparatus for implementing one or more steps of the described methods.

In some instances, the controlling program 181 may be supplied to the user encoded on one or more CD-ROMs, similar to the CD-ROMs 125, or alternatively may be read by the user from the networks 120 or 122. Still further, software code modules for the controlling program 181 may also be loaded into the system 100 from other computer readable media.

The code modules implementing the controlling program 181 may be executed by the controller processors 170 in a similar manner to the code modules implementing the software application program 133 as described above.

The described methods may alternatively be implemented in dedicated hardware such as one or more integrated circuits performing the functions or sub functions of the described methods. Such dedicated hardware may include graphic processors, digital signal processors, or one or more microprocessors and associated memories.

Figure 2:
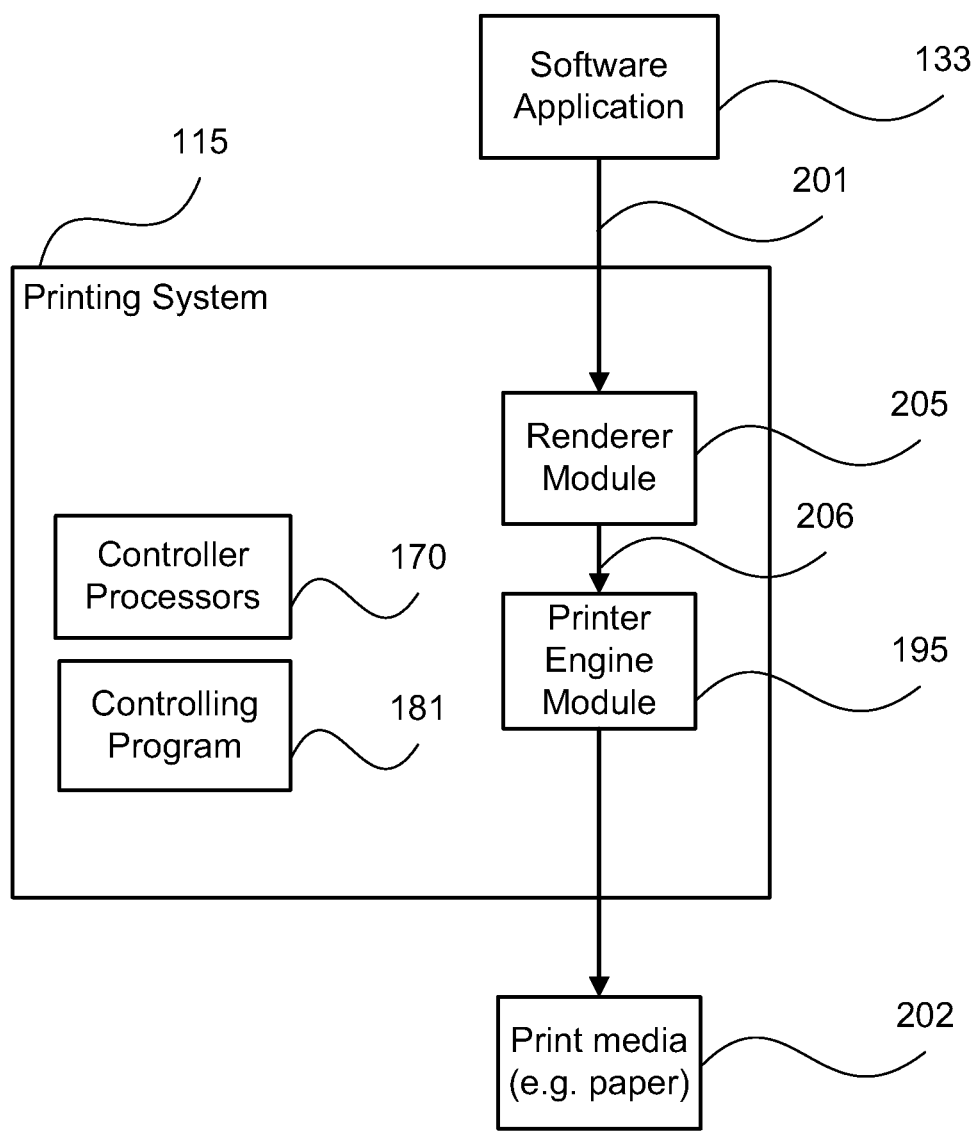
FIG. 2 is a software architecture for the printing system of FIG. 1.

FIG. 2 shows a software architecture for printing a printable page 201 using the printing system 115. Renderer module 205 described below may be formed by one or more of the code modules of the controlling program 181.

The software application 133, for example, executing on the computer module 101, provides the printable page 201 to the printing system 115 for printing to a print media 202, such as a paper sheet. The printable page 201 is typically provided in the form of a description of the printable page 201, the description being specified using a Page Description Language (PDL), such as Adobe® PDF or Hewlett-Packard® PCL. The PDL provides descriptions of one or more graphic objects to be rendered onto the print media 202 in a "painting" (or z) order, as opposed to a raster image (i.e., a bitmap of pixel values) of the page.

The renderer module 205 receives the printable page 201 and is configured for generating an intermediate region-based representation known as a fillmap of the printable page 201 to be printed. The renderer module 205 then renders the fillmap to pixel data values 206. The pixel data values 206 are printed to the print media 202, such as paper, using a printer engine module 195. The printer engine module 195 may, for example, be an electro-photographic engine.

The renderer module 205 may be implemented as one or more code modules of the controlling program 181 which is executed by the controller processors 170 within the printing system 115. Commonly, the renderer module 205 is known as a raster image processor (RIP). The renderer module 205 will be described in more detail later with reference to FIG. 5.

Operation of the printing system 115 is similar to that of the computer module 101 in terms of storage and execution of the controlling program 181 by the memory 190 and the controller processors 170, respectively. However, the controlling program 181 is typically multi-threaded with distinct program threads executing on corresponding ones of the multiple processors 171-174 making up the controller processors 170. As such, the foregoing description of the computer module 101 is generally applicable to the printing system 115. Specifically, the controlling program 181 is typically stored on a memory drive (not illustrated) which may be a hard disk drive or semiconductor hard drive. Further, the controlling program 181 may be loaded via an interface connection (e.g., a USB port) or via the network 120.

Returning to FIG. 1, in the pixel rendering system 100, the software application 133 creates printable pages for printing, such as printable page 201. The printable page 201 often contains graphic objects such as text, lines, fill regions, and image data. The software application 133 sends a high-level description of the printable page (e.g., a PDL file) via the network 120 to the controlling program 181 that is executed by the controller processors 170 of the printing system 115. The printable page 201 contains all information required by the printing system 115 to render and print the page.

In alternative arrangements, the printing system 115, the controller processors 170 and controlling program 181, may be resident in separate servers connected to the network 120. In still another alternative arrangement, the printing system 115, the controller processors 170 and controlling program 181 may be resident in a distributed network of servers. In such systems, the raster image representation produced by the controlling program 181 is sent to the printer engine module 195 via a network 120 rather than the bus 175.

The described methods may also be implemented as part of other graphics rendering systems in which an intermediate representation is rendered (e.g., for displaying PDF documents on an LCD display). As such, the described methods are not limited to printing systems.

A fillmap representation of a graphical image such as a page or band will now be described in more detail. A fillmap is a region-based representation of a page or band. The fillmap maps a region of pixels within the page or band to a fill compositing sequence which will be composited to generate the colour data for each pixel within that fillmap region. Multiple fillmap regions within a fillmap can map to the same fill compositing sequence. Fillmap regions within the fillmap do not overlap and therefore each pixel in the rendered page only belongs to a single fillmap region. Each fillmap region within the fillmap is defined by a set of pixel-aligned fillmap edges which activate the fill compositing sequence associated with that fillmap region. Pixel-aligned fillmap edges:

(i) are monotonically increasing in the y-direction of the page;
(ii) do not intersect with each other;
(iii) are aligned with pixel boundaries, meaning that each pixel-aligned fillmap edge consists of a sequence of segments, each of which follows a boundary between two contiguous pixels;
(iv) contain a reference to the fill compositing sequence required to be composited to render to pixels the fillmap region to which the pixel-aligned fillmap edge belongs; and
(v) activate pixels within a single fillmap region.

The reference to the fill compositing sequence assigned to the fillmap region is used to render the region-based representation in the form of the fillmap region. On any given scan line, starting at a pixel-aligned fillmap edge which activates a fillmap region, and progressing in the direction of increasing x, the fillmap region remains active until a second pixel-aligned fillmap edge which activates a further fillmap region is encountered. When the second pixel-aligned fillmap edge is encountered, the active fillmap region is deactivated, and the fillmap region corresponding to the second pixel-aligned fillmap edge is activated.

Within a fillmap, the fill compositing sequence active within each fillmap region of pixels is stored in a table of fill compositing sequences. A fill compositing sequence is a sequence of z-ordered levels. Each level contains attributes such as a fill, the opacity of the level, a compositing operator which determines how to mix colour data of this level with other overlapping levels, and the priority, or z-order, of the level. A fill specifies the colour or appearance of a single object. A fill may be a flat fill representing a single colour, a blend representing a colour which varies according to a pre-determined function such as a linear gradient or sinusoid, a bitmap image, or a tiled (i.e., repeated) image. A fill compositing sequence contains references to all the levels which contribute colour to the pixels within a fillmap region. The table of fill compositing sequences contains all of the fill compositing sequences required to render the fillmap to pixels. The table of fill compositing sequences does not contain duplicate instances of identical fill compositing sequences. Hence, multiple fillmap regions within a fillmap which map to the same fill compositing sequence map to the same instance of the fill compositing sequence within the table of fill compositing sequences.

Figure 4A:
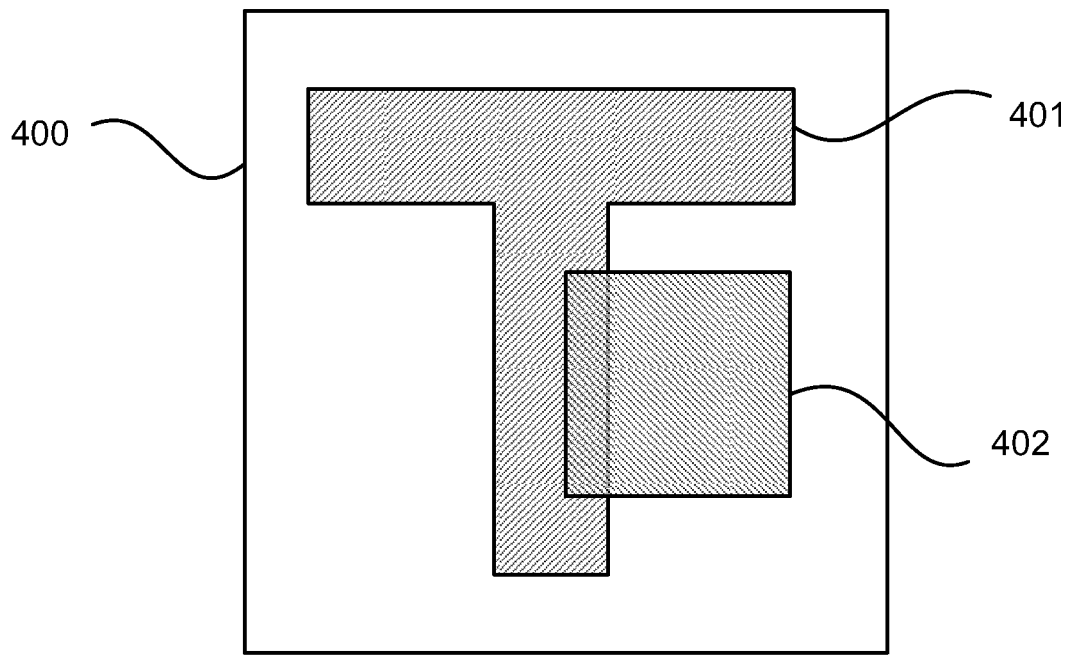
FIG. 4A shows an example of a page with graphic objects.

The generation of a region-based representation, in the form of a fillmap of a page will now be described with reference to FIGS. 4A to 4D. FIG. 4A shows a page representation 400. The page 400 has a white background and contains two graphic objects 401 and 402. The first graphic object 401 is an opaque T-shaped object with a right-leaning hatched fill. The second graphic object 402 is a transparent square with a left-leaning hatched fill. Examples of other fills are blends representing a linearly varying colour, bitmap images or tiled (i.e., repeated) images. The second graphic object 402 partially overlaps the first graphic object 401.

Figure 4B:
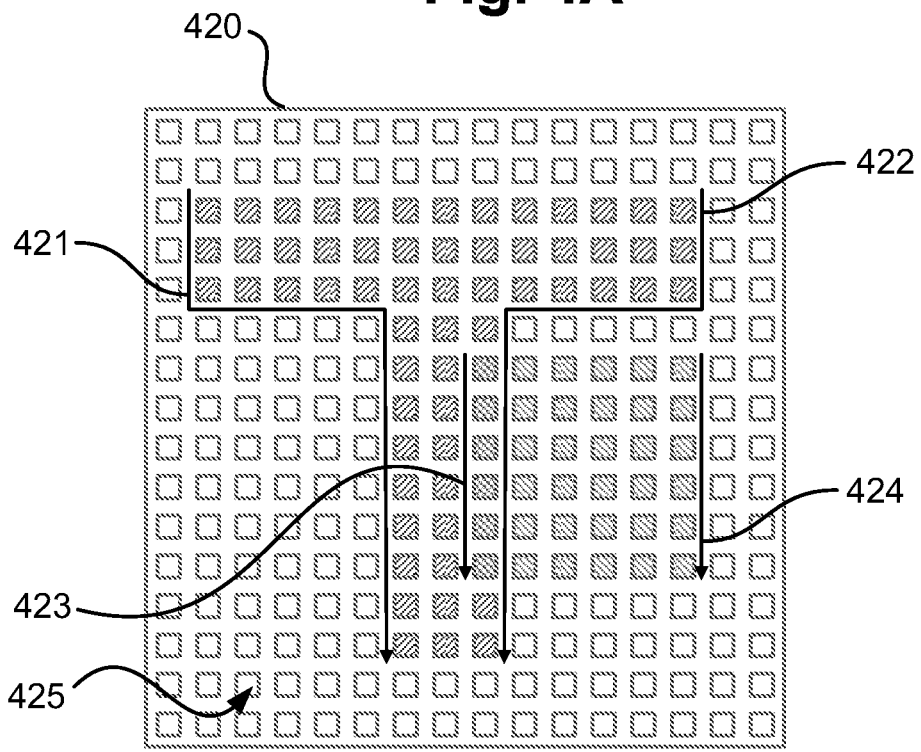
FIG. 4B shows pixel-aligned object edges, and associated fills, of the page of FIG. 4A.
Figure 4B:
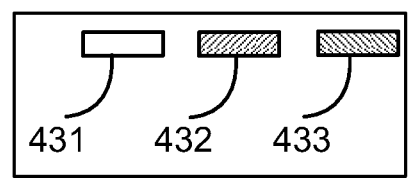

FIG. 4B shows the decomposition of the graphic objects 401 and 402 of the page 400 into pixel-aligned graphic object edges, levels and fills according to a pixel grid 420. A graphic object is decomposed into two or more pixel-aligned object edges (also known as object edges), a single level, and one or more fills. Pixel-aligned graphic object edges define the activation or deactivation of a level during rasterisation. Pixel-aligned graphic object edges therefore refer to the level of the object from which the pixel-aligned graphic object edges are derived. The first graphic object 401 is decomposed into two pixel-aligned graphic object edges 421 and 422, and a level 432 that consists of a right-leaning hatched fill. Pixel-aligned graphic object edges 421 and 422 refer to the level 432 of the first graphic object 401. The second graphic object 402 is decomposed into two pixel-aligned graphic object edges 423 and 424, and a level 433 that consists of a transparent left-leaning hatched fill. Pixel-aligned graphic object edges 423 and 424 refer to the level 433 of the second graphic object 402. The background 425 has a level 431 that consists of white fill.

Figure 4C:
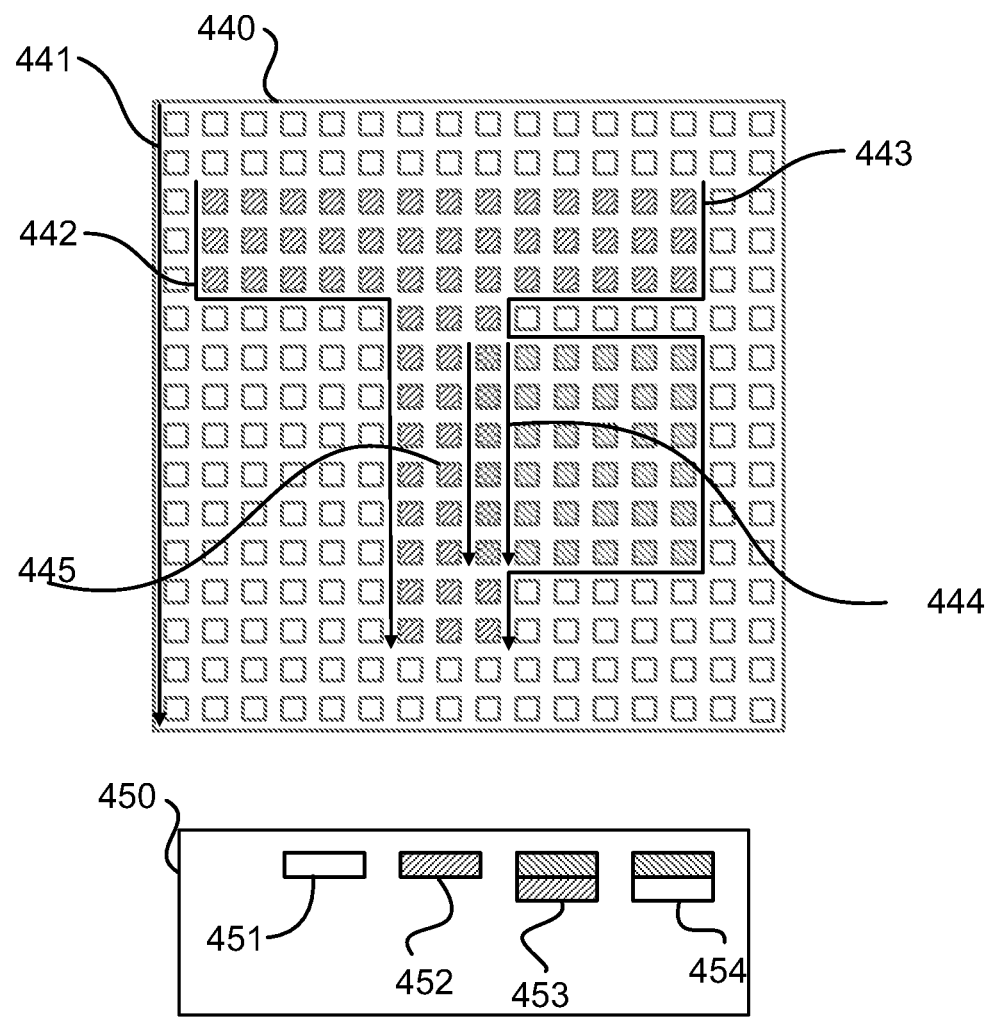
FIG. 4C shows a fillmap representation of the page of FIG. 4A.

FIG. 4C shows a fillmap representation 440 and a table of fill compositing sequences 450, of the page 400 represented in FIG. 4A. The fillmap representation 440 is composed of five pixel-aligned fillmap edges, hereafter known as fillmap edges or simply as edges, and four fill compositing sequences. Each edge references a fill compositing sequence which will be used to determine the colour of each of the pixels activated by that edge. On any given scan line on which an edge is active, the edge activates those pixels which are immediately to the right of the edge, until a next edge or a page boundary is encountered. The first edge 441 traces a left hand boundary of the page 400, and references a fill compositing sequence 451 which contains a single opaque level which is to be filled using the background fill. The second edge 442 traces the left hand boundary of the first graphic object 401, and references a fill compositing sequence 452 that contains a single level which is opaque and is to be filled using a right-leaning hatched fill. The third edge 443 references the same fill compositing sequence 451 as the first edge 441. The fourth edge 444 traces the left hand boundary of the region where the second object 402 overlaps the white background. The fourth edge 444 references a fill compositing sequence 454 which contains two levels. The top most level is transparent and is to be filled using a left-leaning hatched fill. The bottom most level is opaque and is to be filled using the background fill. The fifth edge 445 traces the left hand boundary of the region where the second graphic object 402 overlaps the first graphic object 401. The fifth edge 445 references a fill compositing sequence 453 which contains two levels. The top most level is transparent and is to be filled using a left-leaning hatched fill. The bottom most level is opaque and is to be filled using a right-leaning hatched fill.

Accompanying the fillmap representation 440 of the page 400 is a table of fill compositing sequences 450 which contains the fill compositing sequences 451, 452, 453 and 454 referenced by the edges contained in the fillmap representation 440 of the page 400.

Figure 4D:
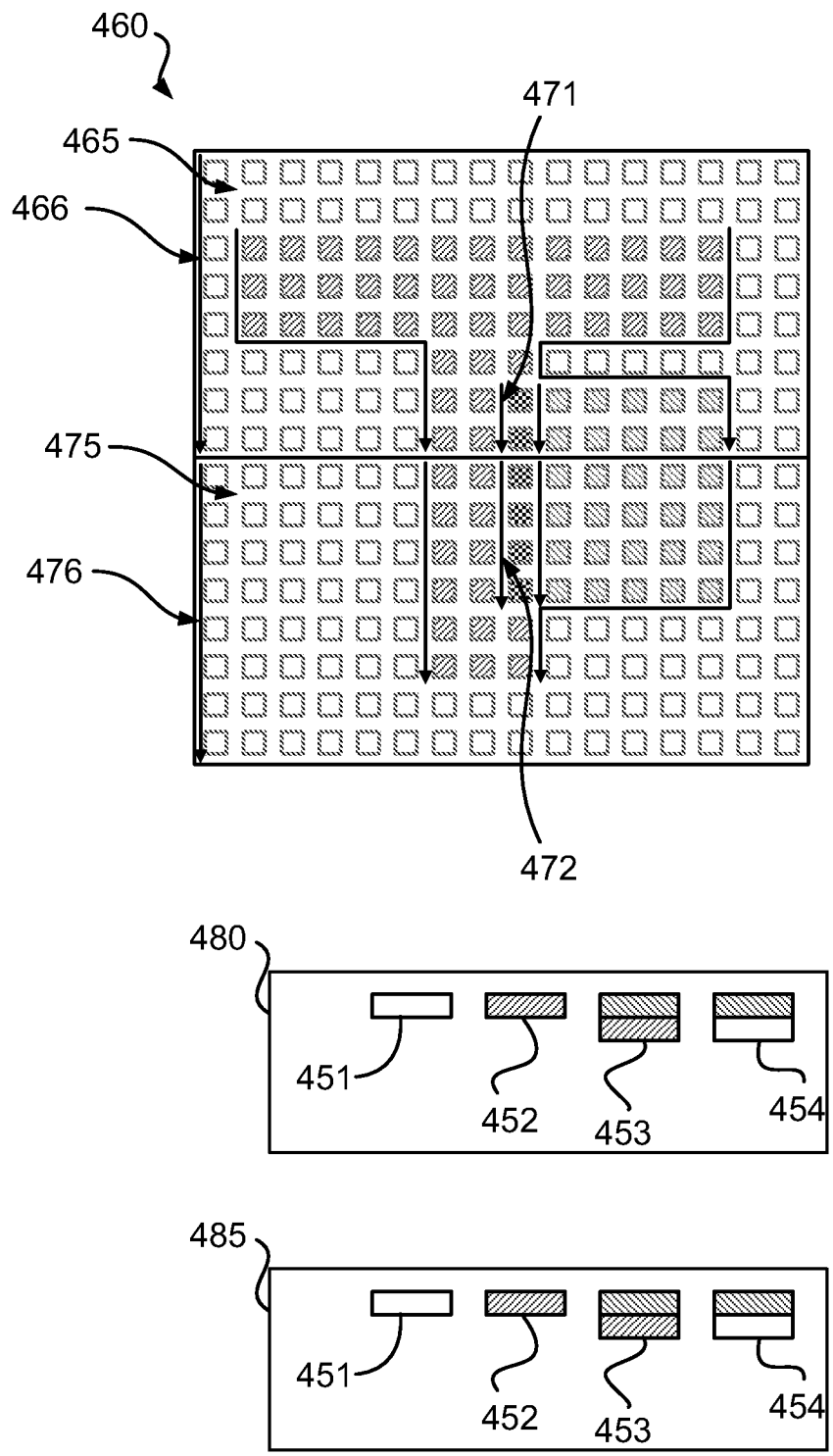
FIG. 4D shows a banded fillmap representation of the page of FIG. 4A.

FIG. 4D shows a banded fillmap representation 460 of the page 400 represented in FIG. 4A according to one arrangement. The banded fillmap contains two bands 465 and 475 treated as separate fillmaps. Each band (e.g., 465 and 475) has a height of eight pixels, which is half the height of the unbanded fillmap representation 440 shown in FIG. 4C. Each band fillmap 465 and 475 has a corresponding table of fill compositing sequences 480 and 485, respectively. The first table 480 of fill compositing sequences contains fill compositing sequences referenced by the edges in band 465, the second table of fill compositing sequences 485 contains fill compositing sequences referenced by the edges in band 475.

In order to generate the banded fillmap representation 460 of the page 400, the edges of the fillmap representation 440 have been split across band boundaries. For example, the edge 441 which traces the left hand boundary of the page in the fillmap representation 440 as seen in FIG. 4C has been divided into two edges 466 and 476 as seen in FIG. 4D. The first edge 466 activates pixels in band fillmap 465, while the second edge 476 activates pixels in band fillmap 475. Also, the table of fill compositing sequences 450 seen in FIG. 4C has been split into two tables of fill compositing sequences 480 and 485.

The fillmap banding method may be extended to any number of bands when the original fillmap such as fillmap representation 440, is split into more than two bands. The two bands may be of the same height.

As described below, band fillmaps (e.g., 465 and 475) may be generated and rendered substantially in parallel, using multi-core processors such as controller processors 170. The methods described below with reference to the generation and rendering of a fillmap representation. However, the methods described below may equally well be applied to any parallel rendering method that splits an image to be rendered into bands.

In one arrangement, the fillmap representation and band fillmap representation stores edges in order of increasing start coordinate. More specifically, edges are sorted first by start y-value, and then edges with equal start y-value are sorted by start x-value. The start coordinate of an edge is the coordinate of the first pixel in the fillmap that the edge activates, when pixels are traversed in scan line order and from left to right. For example, the start coordinate of edge 442 shown in FIG. 4C is (i.e., x=1, y=2), is the coordinate of the first pixel in the fillmap that the edge activates if the coordinate of the top-left pixel is (x=0, y=0). The edge 442 has a start x-value of one (1), and a start y-value of two (2). For example, with reference to the fillmap representation 440, edges are stored in the order edge 441, edge 442, edge 443, edge 445 and edge 444. The remaining coordinates of the first pixel on each scan line activated by an edge may be stored as a sequence of x-values with successive y-values beginning at the start y-value. The sequence of x-values may be further encoded using a method known as "delta encoding". In accordance with the delta-encoding method, each x-value is stored as the difference between the x-value and the previous x-value in the sequence of x-values of the corresponding edge. Therefore, the x-values of the sequence are commonly known as "deltas". In band fillmap representations, edges are stored in a similar way with a separate list of edges retained in the memory 190 for each band fillmap.

Figure 5:
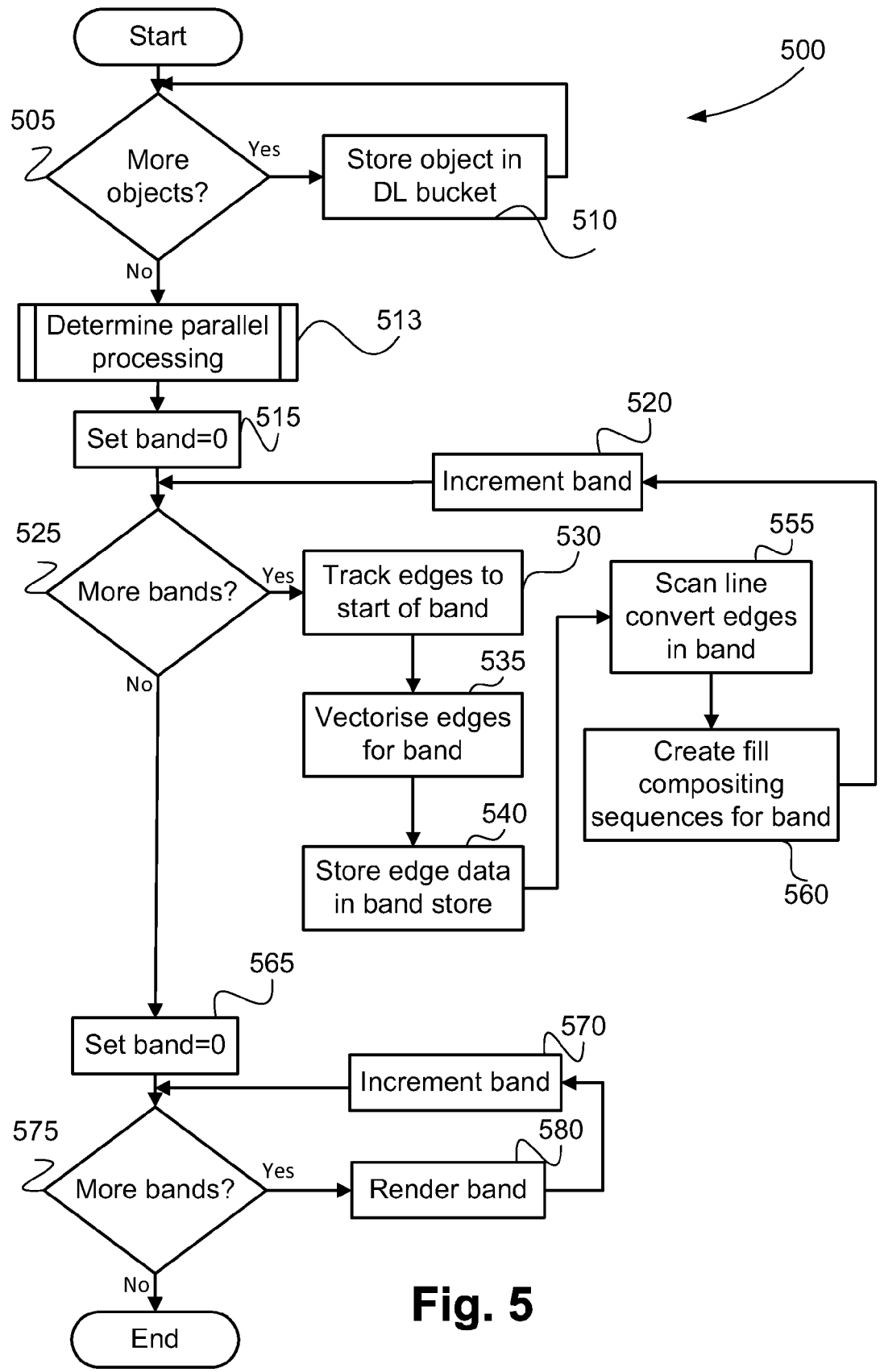
FIG. 5 is a flow diagram showing a method of rendering a page image.

FIG. 5 shows a method 500 of rendering a page image. As described below, the page is rendered as a plurality of bands. The method 500 is performed by the renderer module 205 which, as described above, may be formed by one or more code modules of the controlling program 181 resident in the memory 190 of the printing system 115 and being controlled in execution by the controller processors 170.

Figure 7:
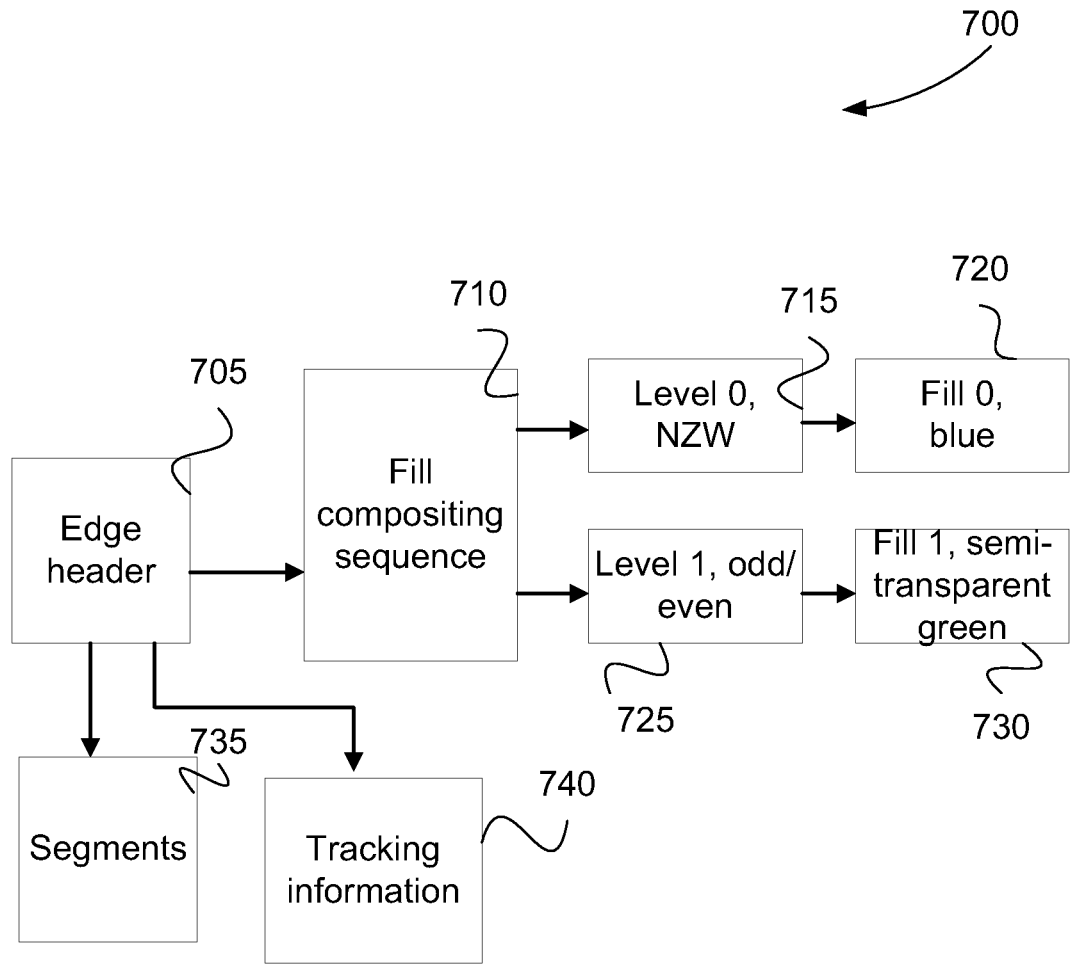
FIG. 7 is a schematic block diagram of an example edge and data associated with the edge.
Figure 8:
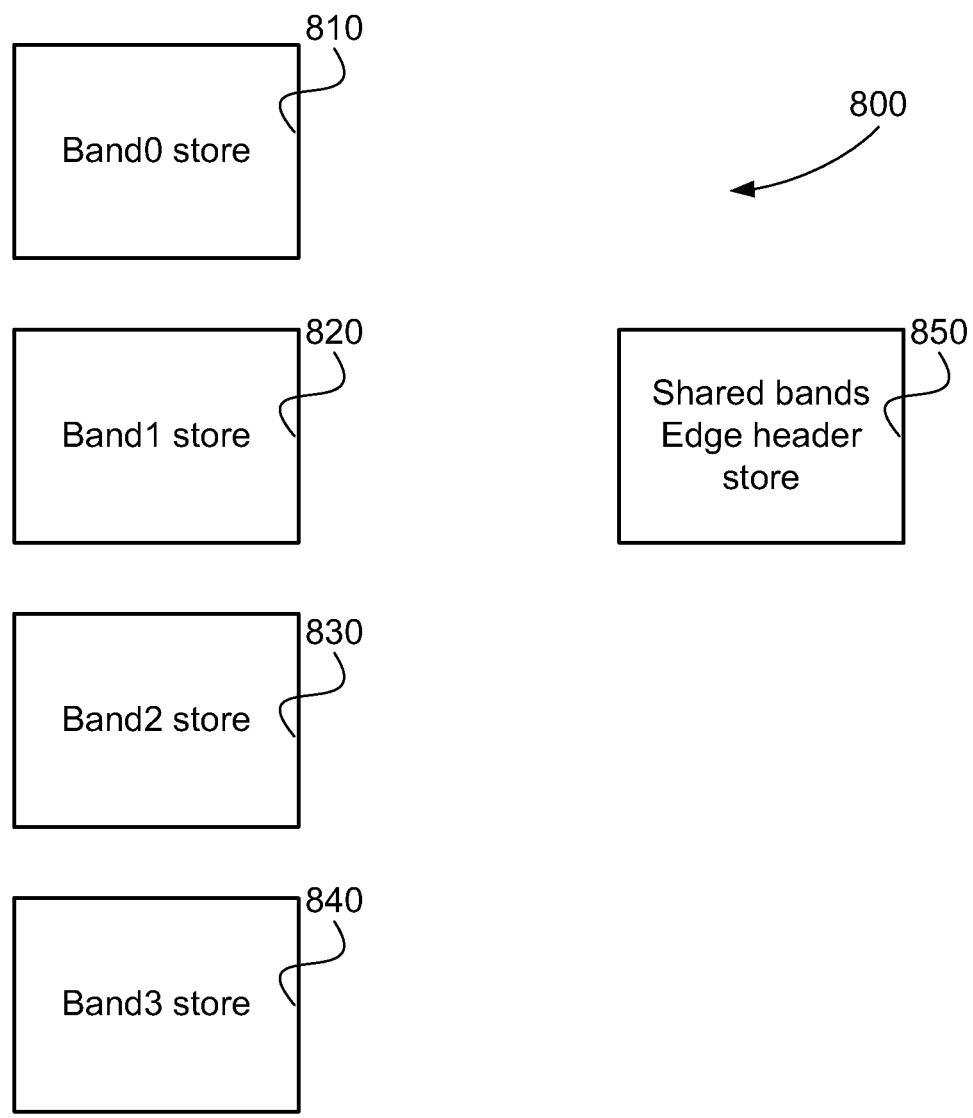
FIG. 8 is a schematic block diagram illustrating the memory organisation of data across multiple bands on a page.

The method 500 creates and updates edge data, as shown in FIG. 7. The updated edge data is stored in one of a plurality of band stores (e.g., 810 to 840) and a shared bands store 850, as shown in FIG. 8. Band stores (e.g., 810 to 840) and shared bands store 850 occupy a portion of memory 190. Band stores 810 to 840 are typically allocated to specific bands being processed using specific ones of the processors 170, to take advantage of operating system NUMA (non-uniform memory access) organisation and avoid unwanted cache-line interference between different program threads. As described below, the method 500 may be configured for scheduling threads on heterogeneous one of the processors (or processing units) 170.

FIG. 7 shows information for an edge 700 stored in band stores 810 to 840. The edge 700 contains an edge header 705 which contains information such as starting y, ending y, edge direction (up or down), and pointers to other data such as segments 735, tracking information 740 and a fill compositing sequence 710, as described above with reference to FIG. 4.

Prior to scan line conversion step 555, the edges of a band are object edges as described above with reference to FIG. 4B. Further, segments 735 are in vector format. After scan line conversion, the segments 735 of the edge 700 consist of x-offset coordinates for each scan line the edge 700 is active for. The x-offset coordinates may be stored differentially encoded in x and further run-length encoded in y. Tracking information 740 stores high precision error information required at step 555 and step 530 whilst executing any suitable scan line conversion algorithms such as Bresenham's algorithm.

At step 560, the fill compositing sequence 710 associated with each edge points to a single level (e.g., 715) associated with the corresponding object. A level (e.g., 715) includes a z-order (0), winding rule (such as non-zero winding (NZW) or odd-even), and a pointer to a fill (e.g., 720) with a colour such as blue. A fill (e.g., 720) can also be an image, or a gradation description, for example. A fill (e.g., 720) can be shared between multiple levels such as levels 715, 725. After the creation of fill compositing sequences at step 560, fill compositing sequence 710 points to a sequence of z-ordered levels, as described above with reference to FIG. 4.

The method 500 begins at checking step 505, where the renderer module 205, under execution of the processors 170, determines whether more objects are available. Objects are typically provided by a PDL (page description language such as PDF, XPS or PCL) interpreter whilst interpreting a corresponding PDL. If more objects are available, then the method 500 proceeds to storing step 510 where a next object is received, and stored in a display list bucket in memory 190 corresponding to the location of the object. A display list bucket is a collection of data corresponding to a particular horizontal subdivision of the page being rendered. The particular horizontal subdivision of the page is referred to herein as a band.

Bands may be of equal size in scanlines, or may vary in size. For example, on page 605 the last band 625 may be smaller than the other bands, depending on the page size. An object spanning multiple bands will be stored at corresponding multiple buckets, with a reference count to ensure memory occupied by the object is freed when access is no longer required. For example, triangle 630 is stored in the memory 190 at three display list buckets corresponding to bands 610, 615 and 620, with a reference count of three. Sufficient "book-keeping" information on each object is also maintained within the memory 190 at step 510 to allow the complexity of processing bands of the page to be determined at step 513. For example, the book-keeping information may include a number of edges in a band or number of fills.

When the renderer module 205 determines that there are no more objects at step 505, then the method 500 proceeds to step 513 where parallel processing is determined. The determination of the parallel processing will be described below with reference to FIG. 9 and FIG. 11. The output of step 513 is a schedule of the processing of bands of the page using processors 170 and the dependencies between the bands. A plurality of distinct rendering schedules is determined for the page with each rendering schedule specifying a dependency for each of the bands. As described below, a dependency between bands is also known as "an edge tracking condition". A dependency for each band may be selected from a corresponding plurality of dependencies for the band. One or more the rendering schedules may be discarded if a predetermined threshold is exceeded. The processing of a band is described below with reference to steps 530, 535, 540, 555 and 560. Steps 530, 535, 540, 555 and 560 are executed using a specific one of the processors 170 as specified by a schedule determined at step 513. Steps 530, 535, 540, 555 and 560 may therefore be executed in parallel for different bands using different processors 170, depending on the band dependencies indicated in the schedule produced at step 513.

At setting step 515, a band number is set to zero (0). Then at checking step 525, if more bands require processing, processing proceeds to step 530 where the renderer module 205 begins processing of the band corresponding to the current band number under execution of the specified processor 170 indicated by the schedule.

At tracking step 530, the edges of any objects that intersect the band and start before the start of the band are tracked to the start of the band. At step 530, the renderer module 205 first determines if the band is dependent on a previous band, as indicated in the schedule determined at step 513. The band is dependent on a previous band if processing of the band requires data produced by the previous band and therefore cannot start until the previous band is finished.

If the renderer module 205 determines that the band is dependent on a previous band at step 530, the schedule guarantees that the previous band will have finished processing and the edge headers 705 of any relevant edges will be stored in the shared bands store 850. The edge headers and tracking information of the relevant edges is copied to the band store 810 to 840 associated with the band being processed. Then, the tracking information 740 is used to track the edges from the end of the previous band to the start of the band being processed. As described above, tracking typically involves vectorising the edges (and scan line converting the edges if needed) across the bands between the previous band and the band being rendered, until the edge information 740 represents the state of the edges at the start of the band being processed. Vectorisation may involve flattening Bezier curves, or stroking. If the previous band is immediately prior to the band being rendered, tracking may be skipped as the edge information 740 already represents the state of the edges at the start of the band being processed.

If the renderer module 205 determines at step 530 that the band is not dependent on a previous band, tracking occurs from the start of the page, at which no existing edge information is known. Edge headers and associated edge information 740 is therefore created in the associated band store 810 to 840 and is used to track the edges in a manner similar to when edge information 740 is reused.

The method 500 then proceeds to step 535 where edges for objects belonging to the display list bucket corresponding to the band being processed are vectorised through the scan lines of the band. Tracking information 740 for edges that start before the start of the band (as calculated at step 530) is used.

At storing step 540 edges intersecting the band are stored in the corresponding band store 810 to 840 configured within the memory 190. If a following band is dependent on the band being processed, edges which span scan lines following the band being processed also have an edge header 705 entry added to the shared bands store 850, so that the tracking information can be reused.

The method 500 then proceeds to scan line converting step 555, where edges 705 belonging to the current band are scan line converted by the renderer module 205 under execution of the specified processor 170, with the effect that vector segments 735 corresponding to the current band are replaced with pixel-aligned x-positions that define the first pixel activated by the edge on each scan line the edge intersects.

At step 555, high-precision x, y and error primitives are stored as tracking information 740. Upon completion of step 555, the tracking information 740 for those edge headers stored in the shared bands store 850 will be ready to be reused at step 530 when dependent bands are processed.

The method 500 continues at creating step 560, where fill compositing sequences are created for the current band by the renderer module 205 under execution of the specified processor 170. The edges in the band are traversed at step 560 from left-to-right, top-to-bottom, utilising segments 735 to determine the x-offset at each scan line, if necessary sorting the edges in x-order at the start of the scan line. At each edge, it is determined whether the corresponding object is entered or exited in the manner described above with reference to FIG. 4. Levels (e.g., 715, 725) still active at each edge 705 are attached to the fill compositing sequence 710 of the edge in order of increasing z-order. At this point, the edge, which was previously an object edge, becomes a fillmap edge as described previously with reference to FIG. 4C. Also, the band fillmap for the current band is complete.

At incrementing step 520, the band number is incremented, and the method 500 returns to step 525. When the renderer module 205 determines at step 525 that all bands have been processed, then the method 500 continues to resetting step 565 where the band number is reset to zero (0).

Following step 565, the method 500 then proceeds to checking step 575, where whilst the renderer module 205 determines that there are more bands to be processed, the band fillmap of each corresponding band of the page image is rendered at step 580 to pixel data values in order to render the page. As described below, the page is rendered in accordance with a selected rendering schedule, the rendering schedule being selected based on a cost determined for the rendering schedule. Rendering may include traversing the scan lines of the band, decoding the segments of the fillmap edges, forming spans between edges and evaluating the fill compositing sequences of each edge using compositing operations such as combining blue 720 with semi-transparent green 730 at pixels where both levels 715 and 725 are active.

The band number is incremented at incrementing step 570, and the method 500 returns to step 575. When all bands are processed, the method 500 concludes.

At the completion of step 565, step 580 can be executed independently and in parallel for each band, as each band fillmap is completely independent as described above with reference to FIG. 4D.

Band parallelism throughout the pipeline is constrained at steps 535 and 555. In particular, the vectorisation and scan line conversion of edges which require information that spans multiple bands is constrained. An algorithm to alleviate this constraint is described below.

Figure 6:
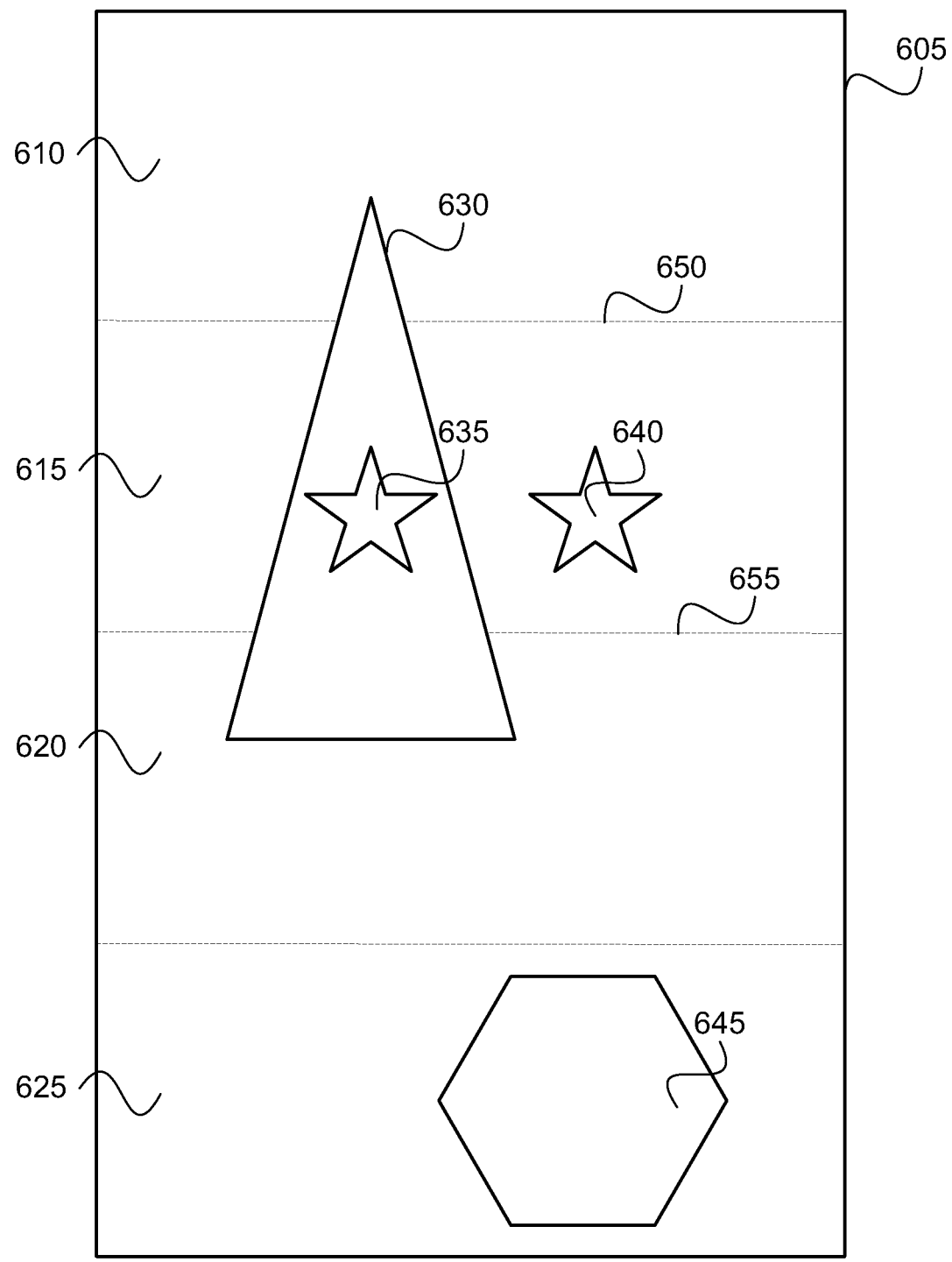
FIG. 6 shows an example of a banded page with objects on the page.

FIG. 6 shows the example page 605 comprising bands 610, 615, 620 and 625. Band 610 partly contains triangle 630 at level 715 with a blue fill 720. Band 615 is considerably more complex, containing part of triangle 630, composited with star 635 at level 725 with a semi-transparent green fill 730, and an additional star 640. Band 620 comprises the remaining part of triangle 630. Finally, band 625 contains hexagon 645.

As described above, the processing of a band cannot commence until the state at the start of the band for all objects that intersect the band are known. In one arrangement, the state of an object is represented by the tracking information 740 associated with each edge of the object. Referring to FIG. 6, processing of band 615 (beginning at step 535) therefore cannot commence until the tracking information 740 of the edges of triangle 630 at the start of band 615 (at y-value 650) is known. The tracking information 740 may be provided using one of two options:

1. by tracking all objects that start prior to the start of the band (i.e., object 630) from the start of the page; or
2. by waiting for a previous band to finish processing and to provide tracking information 740 for these objects.

For example band 615, tracking information 740 for object 630 at the start of the band 650 may be provided by tracking the edges of object 630 up to y-value 650 (option 1), or by waiting for band 610 to finish processing and output tracking information 740 to shared location 850 (option 2). Option 1 has the cost of repeated tracking of portions of objects (e.g., the portion of object 630 in band 610 is processed twice). However, option 1 allows bands (e.g., 610 and 615) to be processed independently and in parallel. Option 2 avoids the repeated processing of objects, but means that there are dependencies between bands which limit parallelism (e.g., band 615 is dependent on band 610 and therefore must wait for band 610 to finish).

Similarly, for band 620, a decision must be made as to whether to: i) independently track edges for triangle 630 through 610 and 615, ii) wait for band 610 to finish processing, and independently track edges for triangle 630 through 615, or iii) wait for band 615 to finish processing, to obtain the edge information 740 at start of band 620 (at y-value 655). A method of making this decision will be described in detail below. However, in the example of FIG. 6, an observation may be made that it is likely more efficient for the renderer module 205 to track the edges of triangle 630 through band 615 when processing the band 620, rather than wait for the edges of the triangle 630 to be tracked with processing the band 615. Waiting for the edges of the triangle 630 to be tracked when processing the band 615 involves waiting for the edges of triangle 630 as well as the edges of complex objects 635 and 640 to be tracked. Processing band 615 is therefore likely to take considerably more time to complete its edge processing than simply tracking the edges of triangle 630. If sufficient processing capacity is available, some capacity may be allocated at step 513 to band 620 to track the edges of triangle 630 through band 615, independent of band 615 processing.

The decision as to whether to: i) independently track edges for triangle 630 through 610 and 615, ii) wait for band 610 to finish processing, and independently track edges for triangle 630 through 615, or iii) wait for band 615 to finish processing, to obtain the edge information 740 at start of band 620 (at y-value 655) are made at step 513, where the renderer module 205 determines a schedule of the processing of bands using the available processors 170. The schedule determined at step 513 is used to decide whether each all objects that a band contains from the start of the page (as at option 1), or wait for a previous band (and which previous band) to produce tracking information 740.

At step 513, the renderer module 205 may determine that a band is dependent on a previous band that is not immediately before the band (in the y dimension). For example, band 620 may be dependent on band 610. In this situation, processing of the band (e.g., 620) will reuse the tracking information provided by the previous band (e.g., 610, at y-value 650), to begin tracking the edges, and renderer module 205 will proceed to track the edges through intervening bands (e.g., band 615) to the start of the band being processed (e.g., 620, at y-value 655). Only edges that intersect the band being processed need to be tracked. For example, when processing band 620, only edges belonging to object 630 need to be tracked to y-value 655; objects 635 and 640 do not intersect band 620 and therefore do not need to be tracked.

Note that processing of the band 625 can proceed in parallel and independently of other bands at decision points 525 and 575, since the content of band 625 (object 645) is wholly contained within band 625.

Figure 11:
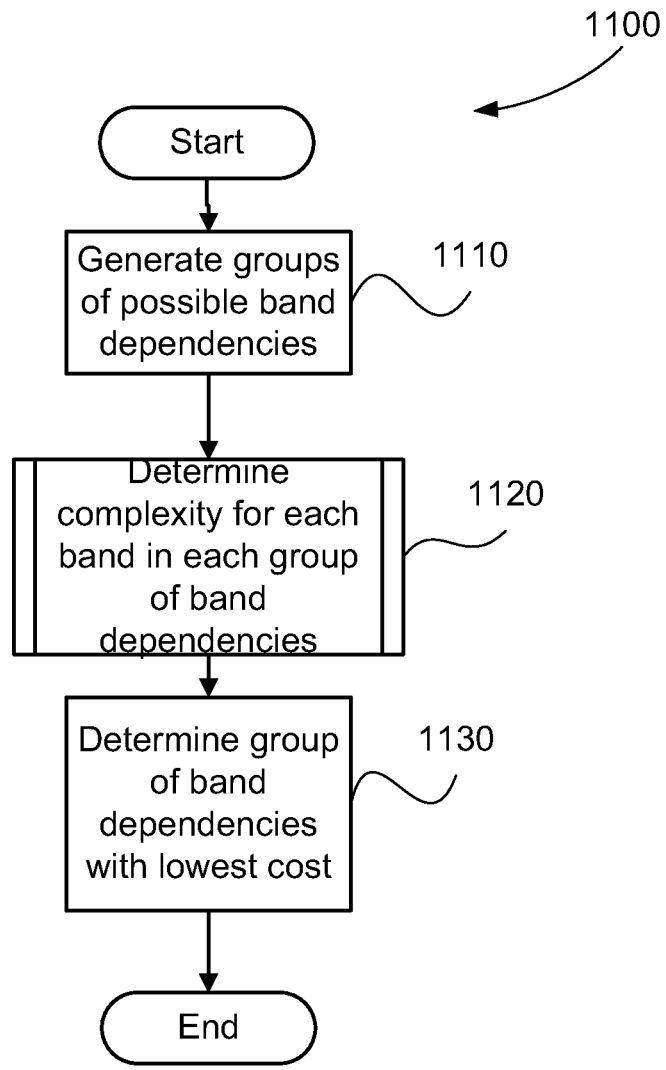
FIG. 11 is a flow diagram showing a method of determining band dependencies as executed in the method of FIG. 5.

The parallel processing decisions are resolved at step 513, which will now be described with reference to FIG. 11. In particular, a method 1100 of determining band dependencies, as executed at step 513, will now be described with reference to FIG. 11. The method 1100 is performed by the renderer module 205 which, as described above, may be formed by one or more code modules of the controlling program 181 resident in the memory 190 of the printing system 115 and being controlled in execution by the controller processors 170.

The method begins at generating step 1110, where the renderer module 205, under execution of the processors 170, generates groups of possible dependencies between the bands of the page being rendered. Each group represents one possibility of dependencies among all bands of the page. As described with reference to FIG. 5, a band is dependent on a previous band (i.e., one that contains scan lines with smaller y-values) if the band cannot begin to be processed until after the previous band has finished being processed as the band requires data produced by the previous band. A band is dependent on a band that contains scan lines with smaller y-values. In addition, a band is only dependent on one previous band.

Dependencies are generated so that a band can reuse the tracking information 740 determined for a previous band, thereby shortening the execution time for processing the band. A dependency between bands is therefore also known as "an edge tracking condition". The method 1100 is used for determining a plurality of dependencies (or edge tracking conditions) for at least one of the bands, each dependency (or edge tracking condition) comprising waiting for at least one other band. However, the generation of dependencies between bands limits the number of bands that can be executed in parallel using the processors 170.

The methods 1000 and 1100 are configured to determine a "best" schedule for processing the bands of a page using the available processors 170. As described below, the determined schedule specifies which of the processors to use to process each band of the page being rendered, and the order in which the bands are processed for each processor 170. The schedule is configured to ensure that tracking information 740 is reused as much as possible, through the generation of dependencies between bands, while ensuring that sufficient bands are processed in parallel to efficiently utilise the available parallel processors 170. Such a schedule, when executed, results in the smallest possible time to process all the bands of the page being rendered.

Figure 9:
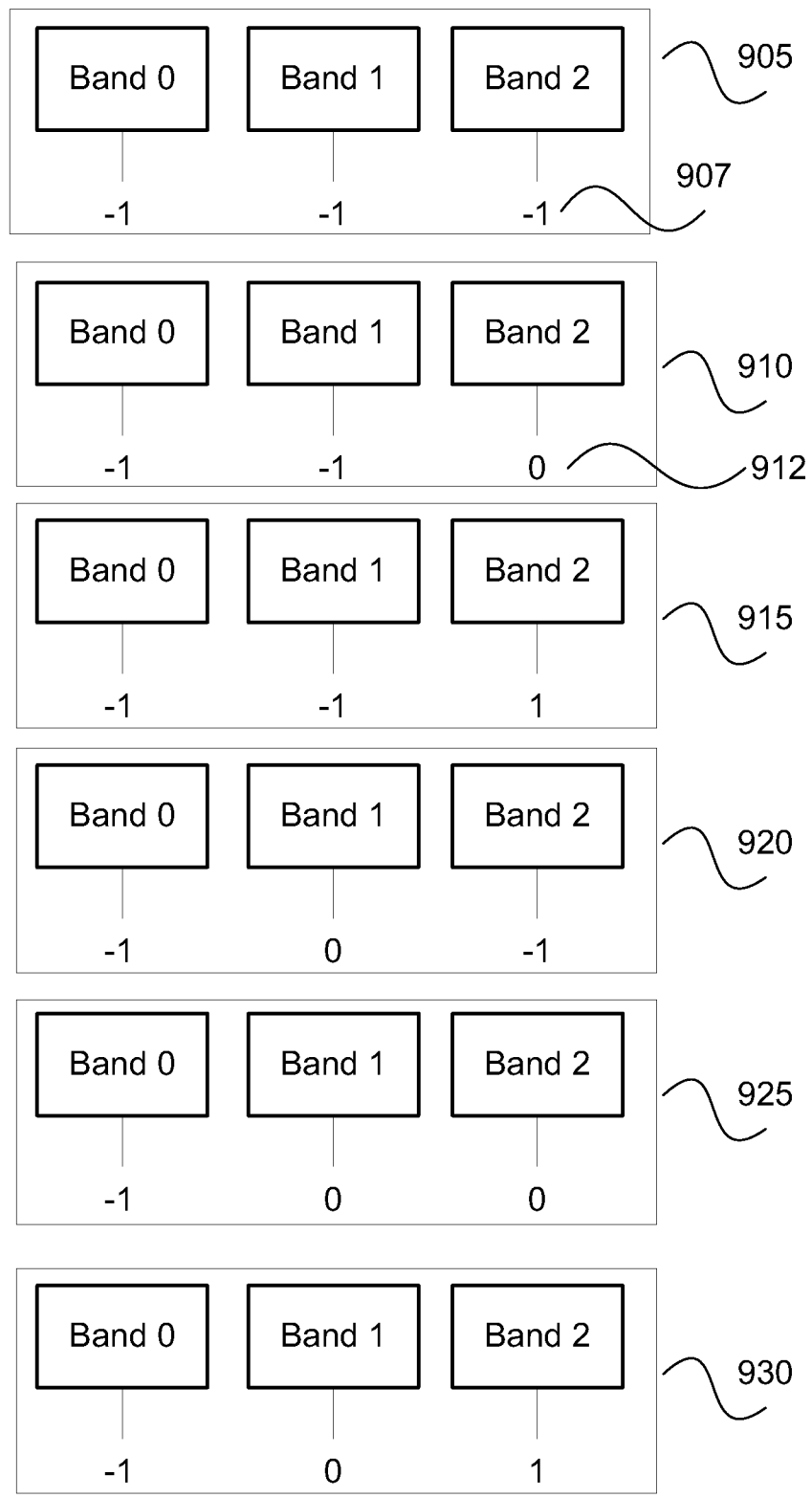
FIG. 9 is a schematic block diagram showing illustrating the possible groups of band dependencies.

An example of the generation of the groups of possible dependencies between three bands (e.g., as determined at step 1110) is shown in FIG. 9. Group 905 is a default group where there are no dependencies between bands (i.e., Band 0, Band 1, Band 2), and all edges belonging to objects intersecting a band are tracked from the origin of the object to the start of the band (i.e., tracking information 740 from previous bands is not reused). As there are no dependencies, indicated by dependency value labelled "−1" (e.g., 907), all bands can be processed by the renderer module 205 in parallel. As indicated by 907, a dependency value of "−1" (i.e. no dependency) is also referred to herein as an edge tracking condition.

Group 910 is another group of possible band dependencies, where band 0 and band 1 can proceed independently and in parallel, but band 2 must wait for band 0, indicated by dependency value 912 labelled "0". As such, band 2 can reuse the tracking information 740 created by band 0. Similarly groups 915, 920, 925 and 930 are the remaining groups of possible band dependencies for three bands. Where a group indicates a dependency, but the dependency in reality does not exist (e.g. band 625 has no dependency on any previous band), the renderer module 205 may immediately discard the group at step 1110 without further processing for that group. Alternately, the renderer module 205 may determine that a band, such as band 625, does not require edge data from any previous bands, and therefore the renderer module 205 does not create a schedule group where the band 625 has a dependency on a previous band.

The method 1100 continues at determining step 1120, where the renderer module 205 determines the complexity of each band in each group of possible band dependencies. In one arrangement, the determined complexity of a band represents estimated duration of the processing of the band.

Figure 10:
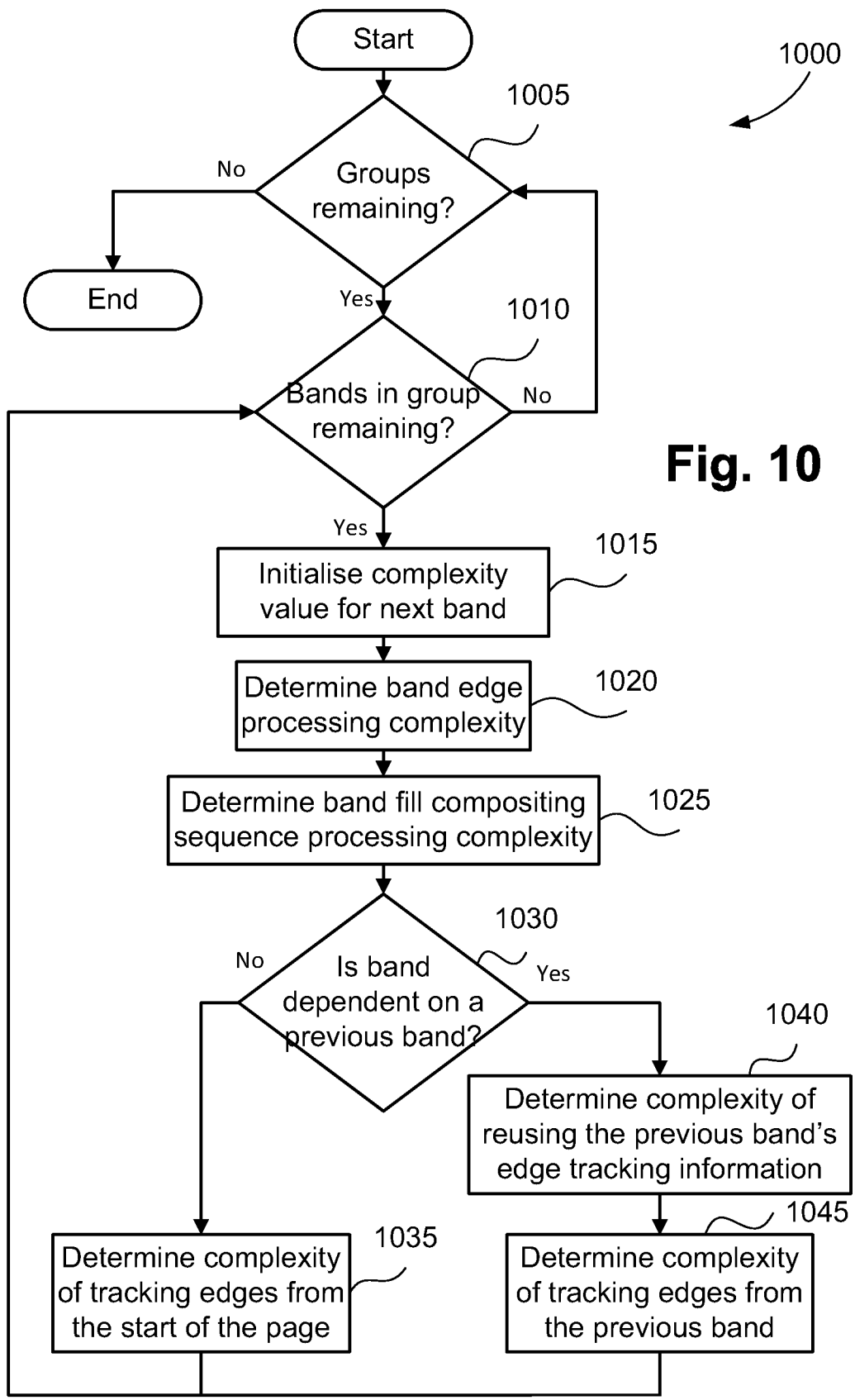
FIG. 10 is a flow diagram showing a method of determining the complexity of each band in a group of band dependencies, as executed in the method of FIG. 11.

A method 1000 of determining the complexity of each band in each group of possible band dependencies, as executed at step 1120, will now be described with reference to FIG. 10. The method 1000 is performed by the renderer module 205 which, as described above, may be formed by one or more code modules of the controlling program 181 resident in the memory 190 of the printing system 115 and being controlled in execution by the controller processors 170. As described below, complexity values determined at steps 1035, 1040 and 1045 are also collectively known as "the cost" of edge tracking.

The method 1000 begins at checking step 1005 where the renderer module 205, under execution of the processor 170, determines if there are groups of band dependencies remaining to be processed. If there are groups remaining, then the method 1000 proceeds to checking step 1010. Otherwise, the method 1000 concludes.

At step 1010, if the renderer module 205 determines that there are bands remaining in a next group for which complexity is to be determined, then the method 1000 proceeds to initialising step 1015. Otherwise, the method 1000 returns to step 1005.

At step 1015, the determination of the complexity of the next band is initialised, for example, by initialising a "complexity" value configured within the memory 190. Since band complexity represents the time taken to process the band, the complexity value is initialised to a value of zero at step 1015.

The method 1000 then proceeds to determining step 1020, where the complexity of processing the portions of edges that intersect the band is determined. The edge processing complexity determined at step 1020 represents a first cost value associated with independent rendering of the band. In particular, the complexity determined at step 1020 represents the complexity of vectorising the portions of edges intersecting the band (as performed at step 535), storing the edge data in the band store (as performed at step 540), and scan line converting the portions of edges that intersect the band (as performed at step 555). The complexity determined at step 1015 may be based on the number of edges that intersect the band, the number of crossings of scan lines with the edge portions that intersect the band, and the number of scan lines in the band. The complexity determination is appended to the complexity value for the complexity of the band that was initialised at step 1015.

The method 1000 then proceeds to determining step 1025, where the complexity of processing the fill compositing sequences associated with the edges that intersect the band is determined. The fill compositing sequence processing complexity determined at step 1025 represents the complexity of creating and storing the fill compositing sequences associated with the generated fillmap edges (as performed at step 560). The complexity determination performed at step 1025 may be based on the number of objects overlapping the band, the number of fills in the band, and the number of transparent fills in the band. The complexity determination is appended to the determination of the complexity of the band that was initialised at step 1015.

The method 1000 then proceeds to step 1030, where if the renderer module 205 determines that the band is dependent on a previous band, then the method 1000 proceeds to step 1040. Otherwise, the method 1000 proceeds to step 1035. The dependencies between bands within a group of possible band dependencies were calculated at step 1110 of the method 1000. Dependencies between bands were described previously with reference to FIG. 11 and FIG. 9.

If it is determined at step 1030 that the band is not dependent on a previous band, as indicated by a dependency value of "−1", then the method 1000 proceeds to step 1035 where the complexity of tracking edges from the start of the page to the start of the band is determined by the renderer module 205 under execution of the processors 170. If a band has no dependencies, all edges that intersect the band and start on a scan line prior to the first scan line in the band need to be tracked up to the start of the band, to establish the tracking information 740 for all edges active at the start of the band. As the band is not dependent on a previous band, there is no opportunity for tracking information stored by a previous band to be used for the band. For this reason, the edges are tracked from the start of the page being rendered. The tracking process is performed at step 530 of the method 500. The complexity determined at step 1035 may be calculated based on the number of crossings of scan lines prior to the band with the edges that intersect the band. The complexity determined at step 1035 is appended to the complexity of the band that was initialised at step 1015. Upon completion of step 1035, the method 1000 returns to step 1010.

If it is determined at step 1030 that the band is dependent on a further previous band, as indicated by a dependency value other than "−1", then the method 1000 proceeds to step 1040 where the complexity of reusing the tracking information data of the previous band is determined. The complexity determined at step 1030 represents a second cost value associated with rendering the band using the tracking information data from the previous band. The second cost value comprises the cost of transferring the tracking information data from the previous band for use in rendering the band.

The dependency indicates that, upon completion of the processing of the previous band, edge headers for edges that continue to scan lines following the previous band will be stored in the shared bands store 850 configured within the memory 190. When a band that is dependent on the previous band is processed, the tracking information associated with these edges can be located and reused. The reuse of the tracking information saves the renderer module 205 from having to track intersecting edges of the dependent band for scan lines prior to the end of the previous band. The renderer module 205 can instead start tracking from the first scan line after the previous band that the band depends on, reusing the stored tracking information 850.

The complexity calculated at step 1040 is an indication of the time taken to locate the relevant edge headers in the shared bands store 850 and move the relevant edge headers to the memory associated with the dependent band (e.g., band store 830), as performed at step 530. The complexity determination performed at step 1040 may be determined based on the number of edges that intersect both the dependent band and previous band. The complexity determined at step 1040 is appended to the complexity of the band that was initialised at step 1015. Due to waiting for the previous band specified in the edge tracking condition, the complexity value (or second cost value) determined at step 1040 may comprise a cost of tracking edges from the end of the previous band specified in the edge tracking condition through at least one intermediate band positioned between the band and the previous band. It should be noted that only edges present in the dependent band are tracked through the at least one intermediate band. It is also noted that in this scenario processing of the dependent band will be delayed until the edge tracking process for every edge in the previous band has been completed, even if some edges present in the previous band do not exist in the dependent band.

The method 1000 then proceeds to step 1045 where the complexity of tracking edges from the end of the previous band to the start of the band is determined. As the band is dependent on the previous band, the edge information 740 associated with edge headers stored in the shared bands store 850 associated with the previous band is used to initialise the tracking process. Only edge information 740 associated with edges that intersect the band being processed is required. The edge information 740 along with the segments 735 will then be used to track the edges to the start of the band (as performed at step 530). The complexity determined at step 1045 may be calculated based on the number of crossings of scan lines between the band and the previous band with the edges that intersect the band. The complexity performed at step 1045 may be determined in accordance with Equation (1), as follows:

$$t(i,a)=\Sigma_{k=a+1} r(k,i), \quad (1)$$

where t(i, a) is the tracking complexity, as a function of i and a.
i is the band whose complexity is being determined,
a is the previous band that band i is dependent on, and
r(x,y) is the estimated complexity of tracking any edges through band x that start at a band x or earlier, and pass through band y, y≥x. This estimated complexity does not include tracking of edges that terminate prior to band y.

The complexity determined at step 1045 is appended to the complexity value for the band that was initialised at step 1015. Upon completion of step 1045, the method 1000 returns to step 1010.

If renderer module 205 determines at step 1010 that there are no bands in the next group remaining, then the method 1000 returns to step 1005. If it is determined at step 1005 that there are no groups remaining, then the method 1000 concludes. The complexity values determined in accordance with the method 1000 can be measured using training data based on the number of edges, processing speed and memory access speeds, as described above. Alternatively, the complexity values may be determined based on number of operations, number of memory accesses implemented in code and processing speeds of the processors 170. At step 510, sufficient bookkeeping information is maintained on each object (e.g., number of edges in a band, number of fills), to allow the complexity values to be approximated. The complexity values determined at steps 1035, 1040 and 1045 are also collectively known as "the cost" of edge tracking. As described above, the cost for a rendering schedule is based on a dependency, or edge tracking condition, specified for each band. The cost may be determined using a tracking cost of edges associated with the band through at least one intermediate band positioned between the band and a band specified in dependency. In one arrangement, the method 1000 may be used for tracking at least one of the edges through an intermediate band at least twice, the at least one edge being tracked for the intermediate band and for at least one other following band comprising the edge.

Returning now to FIG. 11, after the complexity in each group of band dependencies has been determined at step 1120, the method 1100 proceeds to determining step 1130. At determining step 1130, the renderer module 205, under execution of the processors 170, determines the group of band dependencies that, when scheduled to the available processors 170, will result in least cost (i.e., the least total processing time).

A schedule is produced at step 1130 for each group of band dependencies by assigning the bands to processors 170 in the order in which the bands appear on the page (i.e., in increasing y-order). Each processor 170 is assigned a current complexity value, initialised to zero, indicating total complexity of bands currently assigned to the processor.

A band is assigned to a candidate processor that has the smallest current complexity value. After each assignment, the current complexity value for a processor is increased by the estimated complexity of the assigned band. However, before assigning a band to the candidate processor, the renderer module 205 determines whether this band depends on a previous band, and if so, whether the previous band has completed its edge tracking process. The renderer module 205 may make such a determination by summing the determined complexities of the previous band and each of the bands scheduled to execute prior to the previous band on the candidate processor to which the previous band is assigned. If the determination is successful (i.e. the dependent previous band has already completed), the band is assigned to the candidate processor. If the determination has failed (i.e., the dependent previous band has not yet finished), scheduling of the band is postponed, and an attempt is made to schedule another band. If no other band is available for scheduling, the complexity count of the candidate processor is incremented to the next lowest complexity at which at least one dependent previous band will have completed.

The created schedule represents the estimated execution of the bands on processors 170 for a particular group of band dependencies. The estimated time taken to execute the schedule, being the cost of the group, is equal to the largest current complexity value for the each of the processors 170.

Also at step 1130, the renderer module 205 compares the cost of all groups, and determines the group with the lowest cost. The scheduling operation is merely a simulation intended to determine the total cost. The scheduling operation does not actually carry out the band processing. The group with the lowest cost represents the band dependencies that will be used when processing of the bands commence, upon completion of step 513.

As described above, the complexity values, or cost values, determined in accordance with the method 1000, are used for rendering the page image, where rendering of a particular band is postponed until the data from a previous dependent band is received. The postponing is performed in response to a determination using the determined complexity values that resource utilisation associated with rendering would be reduced due to the postponing.

The assigning of bands to the processors 170 as described above may be performed in a number of ways. For example, the bands may be assigned to bands using "bin packing" algorithms.

In one arrangement, a predetermined ten (10) millisecond budget threshold may be allocated for the method 1100, permitting at most ten (10) bands on modern processor architectures. If needed, multiple controllers 102 may be used to perform the method 1100 in a shorter time frame. Alternately, a co-processor such as a general-purpose GPU (GPGPU) may be utilised to carry out the processing.

Where the number of bands exceeds the predetermined time budget threshold to carry out the required calculations, heuristics may be used to reduce the number of groups of dependent bands under consideration. In particular, the method 1100 may be configured for discarding a group of dependencies (i.e., defining at least one edge tracking condition) if the cost of waiting for a band specified in the group exceeds the predetermined time budget threshold (i.e., the predetermined threshold is exceeded). For example, for adjacent bands 615 and 620, it may be determined in step 1120 that the complexity of band 620 being dependent on band 615 (e.g., the complexity of reusing the tracking information of band 615) is much larger than the complexity of tracking all edges intersecting band 620, as band 620 does not require the tracking of complex objects 635, 640. Therefore, groups of band dependencies where band 620 depends on 615 may be discarded. Further, a time budget may be allocated to the method 1100, where when the time budget expires, the method 1100 terminates early and selects the lowest-cost group of band dependencies determined so-far. Similarly, the method 1100 may be configured to terminate early if a threshold criterion is reached by one of the groups. For example, if the determined execution time of a schedule is 75% of estimated execution time of default schedule 905 (in schedule 905, all bands proceed independently), the corresponding group of band dependencies is selected and the method 1100 is terminated early.

In one arrangement, the described methods may be configured for merging adjacent bands if the cost of transferring edge state information between the adjacent bands exceeds a predetermined threshold. In another arrangement, the methods may be configured for determining a tracking cost value associated with tracking each edge in each band and a transferring cost value associated with transferring edge state data of an edge from a first memory to a second memory.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of rendering an image as a plurality of bands, the method comprising:

determining a plurality of edge tracking conditions for at least one of said bands, the edge tracking conditions comprising waiting for at least one other band;

determining a plurality of distinct rendering schedules for the image, each rendering schedule specifying an edge tracking condition for each of said bands, the edge tracking condition for each band being selected from the corresponding plurality of edge tracking conditions for said band;

determining a cost for a rendering schedule, the rendering schedule cost being based on an edge tracking condition specified for each of the bands using a tracking cost of edges associated with the band through at least one intermediate band positioned between said band and the band specified in the edge tracking condition; and rendering the image in accordance with a selected rendering schedule, the rendering schedule being selected based on the cost determined for the rendering schedule.

2. The method according to claim 1, further comprising discarding an edge tracking condition if the cost of waiting for the band specified in the edge tracking condition exceeds a predetermined threshold.

3. The method according to claim 1, further comprising merging adjacent bands if the cost of transferring edge state information between said adjacent bands exceeds a predetermined threshold.

4. The method according to claim 1, wherein the determined cost is based on training data, processing speed, and memory access speeds.

5. The method according to claim 1, further comprising discarding one or more rendering schedules if a predetermined threshold is exceeded.

6. The method according to claim 1, further comprising scheduling threads on heterogeneous processing units.

7. The method according to claim 1, further comprising tracking at least one of the edges through an intermediate band at least twice, wherein the at least one edge is tracked for said intermediate band and for at least one other following band comprising said edge.

8. The method according to claim 1, further comprising determining a tracking cost value associated with tracking each edge in each band and a transferring cost value associated with transferring edge state data of an edge from a first memory to a second memory.

9. A method of rendering an image as a plurality of bands, the method comprising:

determining a first cost value associated with independent edge tracking of at least one of said bands;

determining a second cost value associated with edge tracking of said band using data from a further band, the second cost value comprising a cost of tracking edges of the further band and a cost of tracking edges associated with said band through at least one intermediate band positioned between said band and the further band; and rendering the image using the first and second cost values, wherein rendering of said band is postponed until edge tracking data is received from the further band, the postponing being performed in response to a determination using the cost values that resource utilisation associated with the rendering would be reduced due to the postponing.

10. The method according to claim 9, wherein the second cost value comprises a cost of transferring data from the further band.

11. An apparatus for rendering an image as a plurality of bands, the method comprising:

means for determining a plurality of edge tracking conditions for at least one of said bands, the each edge tracking conditions comprising waiting for at least one other band;

means for determining a plurality of distinct rendering schedules for the image, each rendering schedule specifying an edge tracking condition for each of said bands, the edge tracking condition for each band being selected from the corresponding plurality of edge tracking conditions for said band;

means for determining a cost for a rendering schedule, the rendering schedule cost being based on an edge tracking condition specified for each of the bands using a tracking cost of edges associated with the band through at least one intermediate band positioned between said band and the band specified in the edge tracking condition; and means for rendering the image in accordance with a selected rendering schedule, the rendering schedule being selected based on the cost determined for the rendering schedule.

12. A system for rendering an image as a plurality of bands, the system comprising:

a memory for storing data and a computer program;

a processor coupled to the memory for executing the computer program, the computer program comprising instructions for:

determining a plurality of edge tracking conditions for at least one of said bands, the edge tracking conditions comprising waiting for at least one other band;

determining a plurality of distinct rendering schedules for the image, each rendering schedule specifying an edge tracking condition for each of said bands, the edge tracking condition for each band being selected from the corresponding plurality of edge tracking conditions for said band;

determining a cost for a rendering schedule, the rendering schedule cost being based on an edge tracking condition specified for each of the bands using a tracking cost of edges associated with the band through at least one intermediate band positioned between said band and the band specified in the edge tracking condition; and rendering the image in accordance with a selected rendering schedule, the rendering schedule being selected based on the cost determined for the rendering schedule.

13. A non-transitory computer readable medium comprising a program stored thereon for rendering an image as a plurality of bands, the program comprising:

code for determining a plurality of edge tracking conditions for at least one of said bands, the edge tracking conditions comprising waiting for at least one other band;

code for determining a plurality of distinct rendering schedules for the image, each rendering schedule specifying an edge tracking condition for each of said bands, the edge tracking condition for each band being selected from the corresponding plurality of edge tracking conditions for said band;

code for determining a cost for a rendering schedule, the rendering schedule cost being based on an edge tracking condition specified for each of the bands using a tracking cost of edges associated with the band through at least one intermediate band positioned between said band and the band specified in the edge tracking condition; and code for rendering the image in accordance with a selected rendering schedule, the rendering schedule being selected based on the cost determined for the rendering schedule.

14. An apparatus for rendering an image as a plurality of bands, the apparatus comprising:

means for determining a first cost value associated with independent edge tracking of at least one of said bands;

means for determining a second cost value associated with edge tracking of said band using data from a further band, the second cost value comprising a cost of tracking edges of the further band and a cost of tracking edges associated with said band through at least one intermediate band positioned between said band and the further band; and means for rendering the image using the first and second cost values, wherein rendering of said band is postponed until edge tracking data is received from the further band, the postponing being performed in response to a determination using the cost values that resource utilisation associated with the rendering would be reduced due to the postponing.

15. A system for rendering an image as a plurality of bands, the system comprising:

a memory for storing data and a computer program;

a processor coupled to the memory for executing the computer program, said computer program comprising instructions for:

determining a first cost value associated with independent edge tracking of at least one of said bands;

determining a second cost value associated with edge tracking of said band using data from a further band, the second cost value comprising a cost of tracking the edges of the further band and a cost of tracking edges associated with said band through at least one intermediate band positioned between said band and the further band; and rendering the image using the first and second cost values, wherein rendering of said band is postponed until edge tracking data is received from the further band, the postponing being performed in response to a determination using the cost values that resource utilisation associated with the rendering would be reduced due to the postponing.

16. A non-transitory computer readable medium having a program stored thereon for rendering an image as a plurality of bands, the program comprising:

code for determining a first cost value associated with independent edge tracking of at least one of said bands;

code for determining a second cost value associated with edge tracking of said band using data from a further band, the second cost value comprising a cost of tracking edges of the further band and a cost of tracking edges associated with said band through at least one intermediate band positioned between said band and the further band; and code for rendering the image using the first and second cost values, wherein rendering of said band is postponed until edge tracking data is received from the further band, the postponing being performed in response to a determination using the cost values that resource utilisation associated with the rendering would be reduced due to the postponing.

* * * * *

UNITED STATES PATENT AND TRADEMARK OFFICE
CERTIFICATE OF CORRECTION

PATENT NO. : 9,147,138 B2  
APPLICATION NO. : 14/572600  
DATED : September 29, 2015  
INVENTOR(S) : Alexander Will Page 1 of 1

It is certified that error appears in the above-identified patent and that said Letters Patent is hereby corrected as shown below:

On the Title Page, Item (30), the following Foreign Application Priority Data should be inserted below the prior publication data, as follows:

--(30)   Foreign Application Priority Data

Dec. 19, 2013   (AU) ...................... 2013273716--

Signed and Sealed this  
Fifth Day of July, 2016

Michelle K. Lee  
*Director of the United States Patent and Trademark Office*